United States Patent [19]

Yoneda

[11] Patent Number: 4,850,787
[45] Date of Patent: Jul. 25, 1989

[54] CARGO VEHICLE

[75] Inventor: Takashi Yoneda, Nishinomiya, Japan

[73] Assignee: Kyokuto Kaihatsu Kogyo Co., Ltd., Hyogo, Japan

[21] Appl. No.: 935,307

[22] Filed: Nov. 26, 1986

[30] Foreign Application Priority Data

Dec. 6, 1985 [JP] Japan .................. 60-275390

[51] Int. Cl.⁴ ............................................. B65G 67/02
[52] U.S. Cl. ..................... 414/499; 414/555; 414/917
[58] Field of Search ............... 414/498, 499, 546, 555, 414/917, 420, 421; 294/82.35, 82.3

[56] References Cited

U.S. PATENT DOCUMENTS

| 2,672,247 | 3/1954 | Jewett | 414/421 |
| 2,693,288 | 11/1954 | Black | 414/498 X |
| 3,499,561 | 3/1970 | Beckwith | 414/420 |
| 3,905,498 | 9/1975 | van der Lely | 414/420 X |
| 3,929,231 | 12/1975 | Cook | 294/82.35 X |
| 4,355,942 | 10/1982 | Rolfe | 414/917 X |
| 4,522,548 | 6/1985 | Oswald et al. | 414/917 X |
| 4,601,630 | 7/1986 | Kress et al. | 414/917 X |

FOREIGN PATENT DOCUMENTS

| 191683 | 8/1986 | European Pat. Off. | 414/421 |
| 31-3170 | 4/1956 | Japan . | |
| 1577573 | 10/1980 | United Kingdom | 414/421 |

Primary Examiner—Robert J. Spar
Assistant Examiner—Stuart J. Millman
Attorney, Agent, or Firm—Wenderoth, Lind & Ponack

[57] ABSTRACT

A cargo-work vehicle for detachably supporting a container has lift arms for rotatably supporting the container and a single cooperating auxiliary arm which ensures that the attitude of the container is held constant when the container is loaded and unloaded. A dump pin is also provided for fixing the container relative to the lift arms so that the container can be rotated relative to the vehicle body for dumping of the container load. The single auxiliary arm is advantageous because it can be located centrally of the vehicle and substantially underneath the loaded container. Such placement of the auxiliary arm affords compactness, reduces costs, and allows a single auxiliary arm to maintain the desired, constant attitude of the container during loading and unloading of the container.

4 Claims, 21 Drawing Sheets

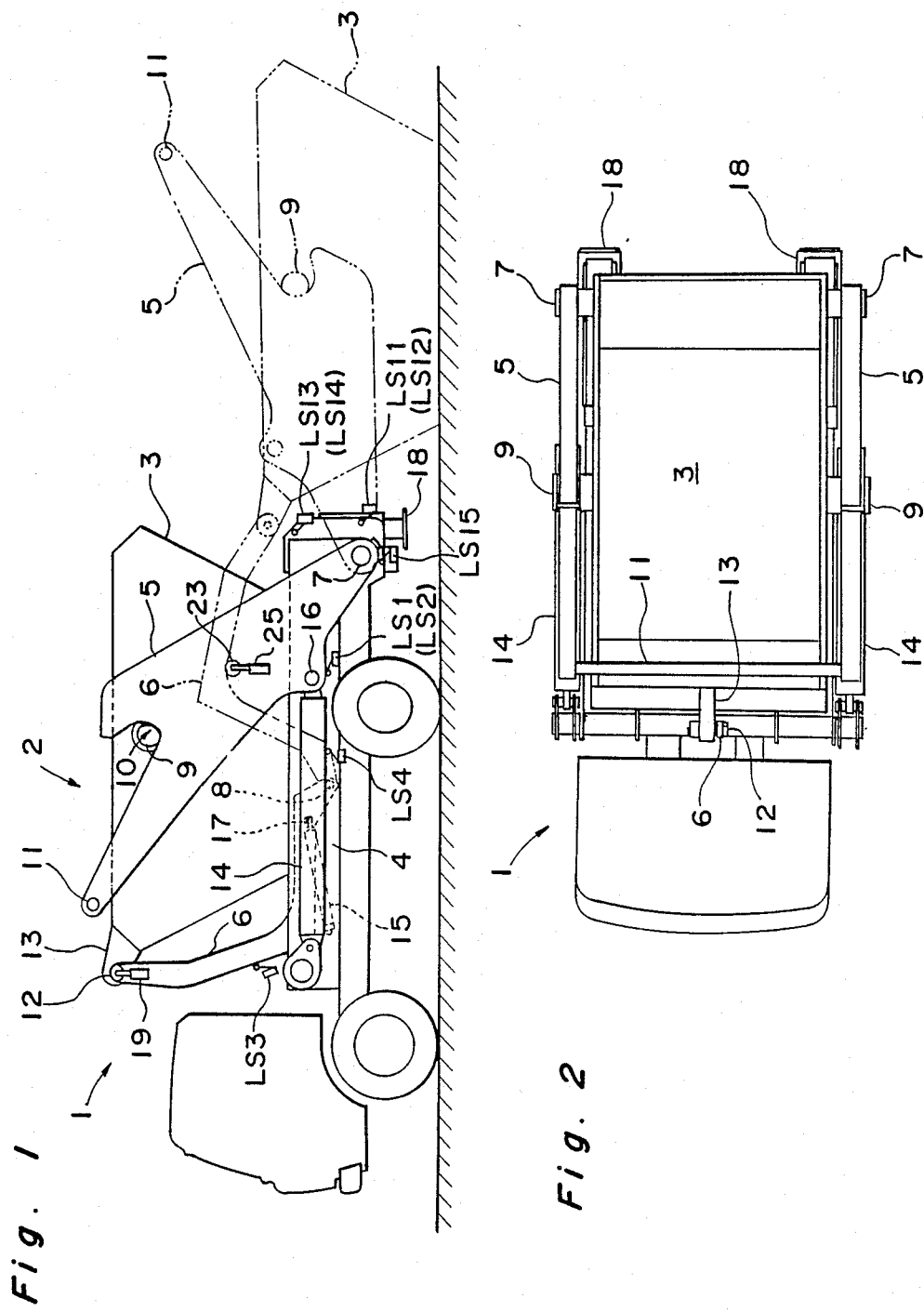

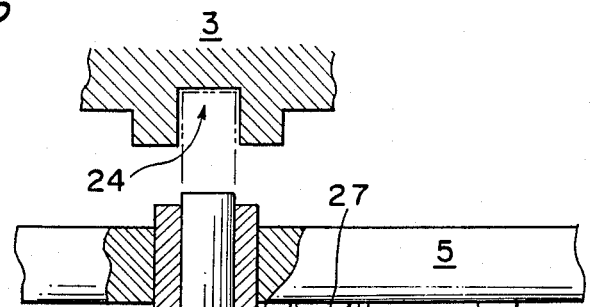
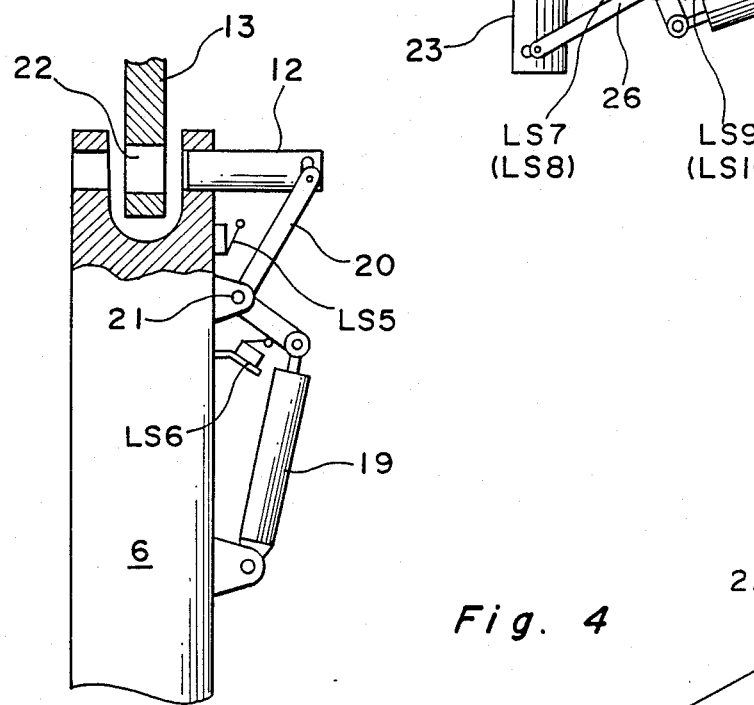
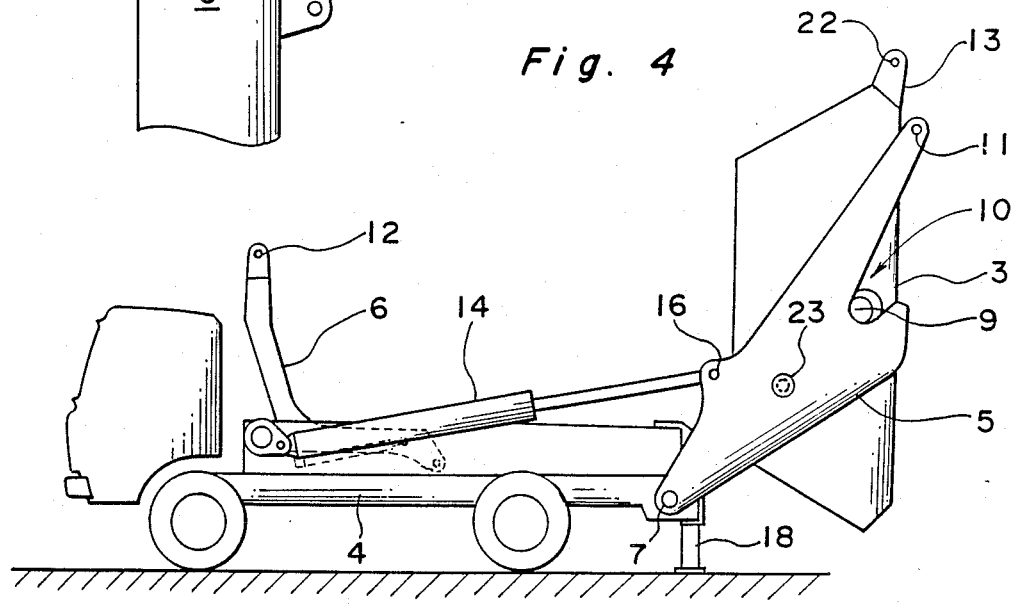

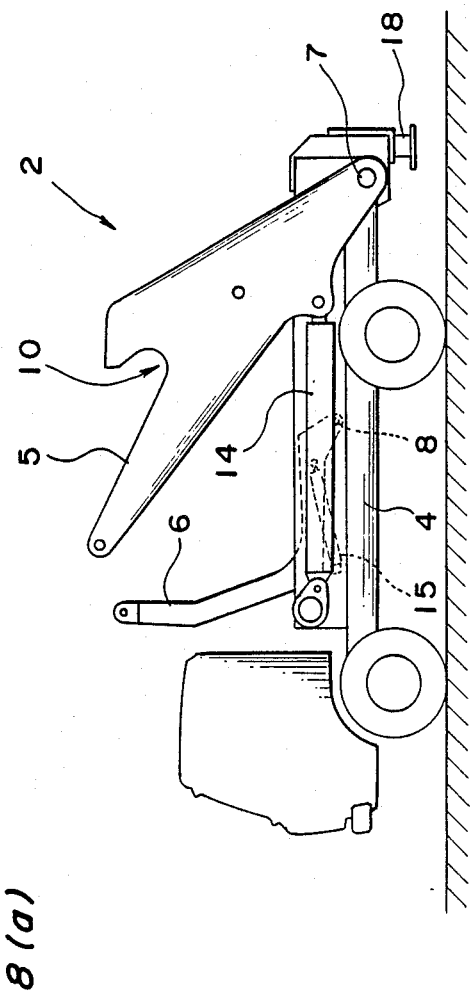
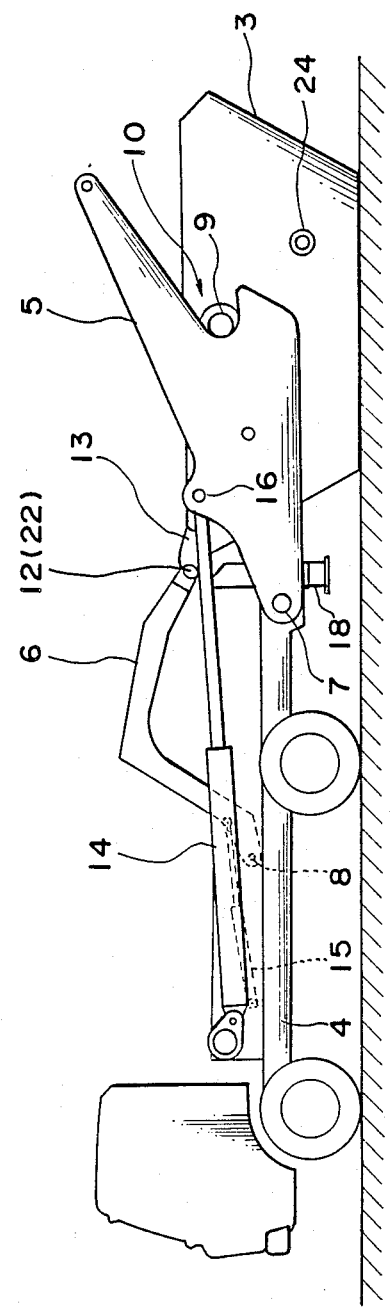
Fig. 8(a)
Fig. 8(b)

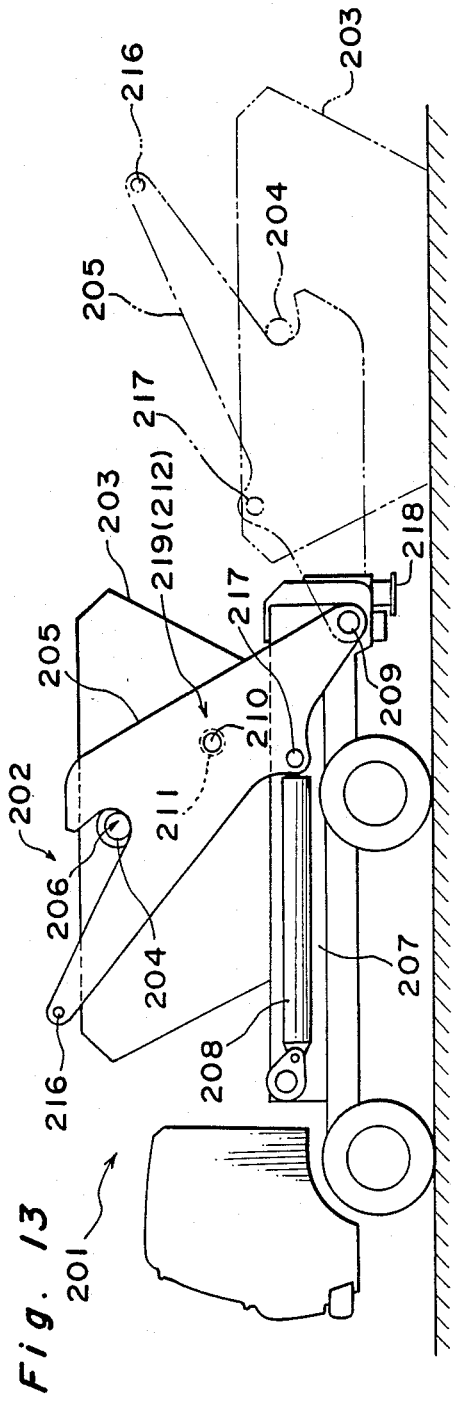
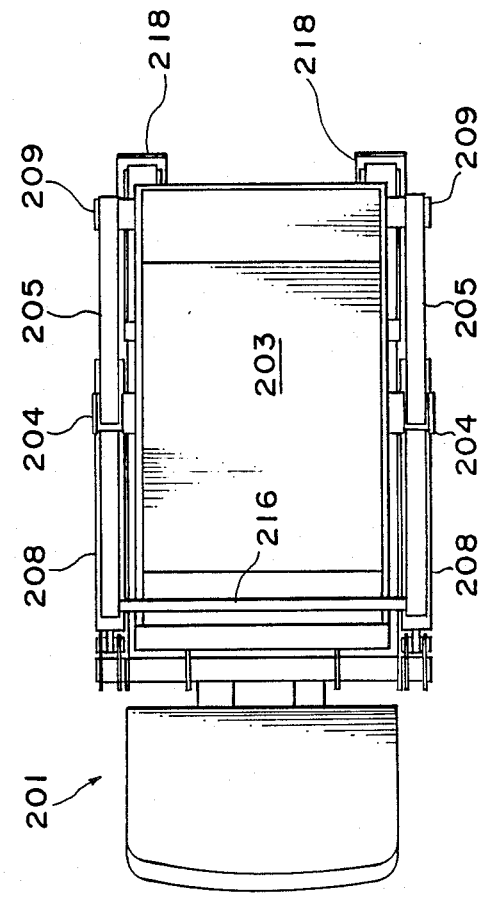

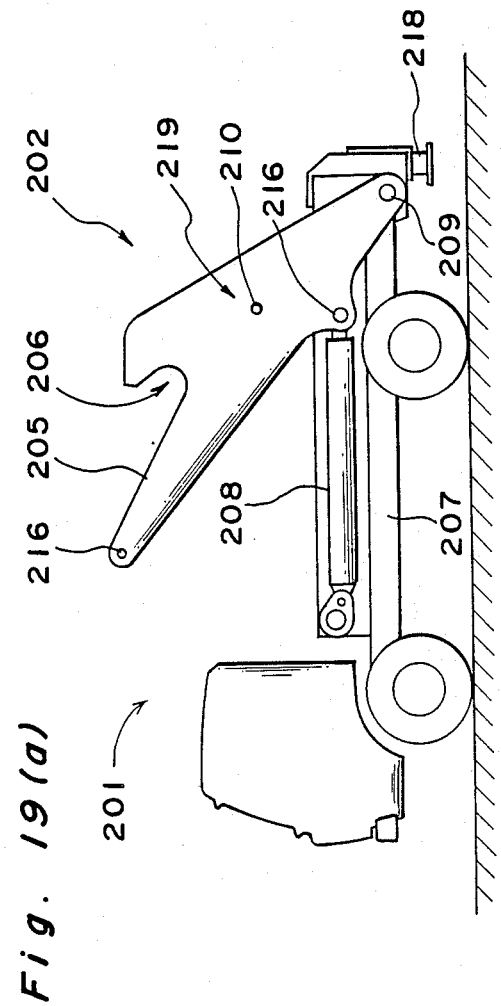
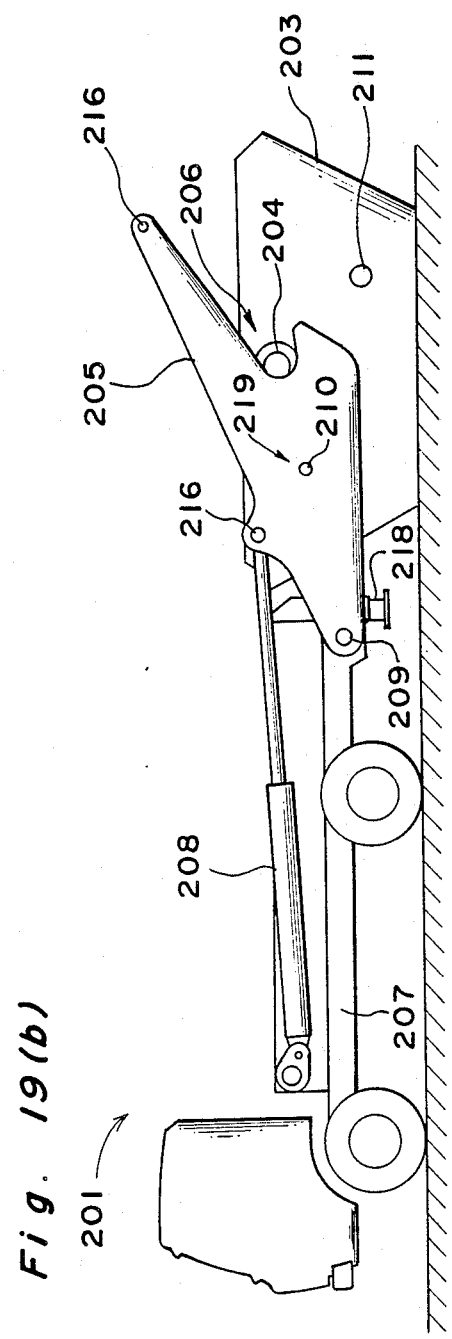
Fig. 19(a)
Fig. 19(b)

CARGO VEHICLE

BACKGROUND OF THE INVENTION

The present invention generally relates to a cargo vehicle, and to a cargo-work controlling apparatus which is adapted to retain the posture of a container on loading the detachable container on the body of the vehicle or unloading it from the body. More particularly, the present invention relates to a cargo-work vehicle, wherein support arms having container supports are provided for front and rear pivotal movements, an auxiliary arm which is adapted to always retain the container in a horizontal condition is provided for front and rear pivotal movements through connection with the container on the front portion of the vehicle body.

Some vehicles carrying the containers have a cargo-work apparatus, which is adapted to load the container on the vehicle body, unload it or replace it. It is necessary to support the container for loading or unloading the container by this apparatus. Thus, support shafts are projected to right and left of the container. To receive the support shafts, the cargo-work apparatus has a lift arm which is formed with the support unit. The lift arm is supported on the body of the vehicle for forward and rearward rotation by a lift cylinder to be operated through hydraulic power or the like. One embodiment wherein this type of lift arm is employed is described in Japanese Patent Publication Tokukosho No. 31-3170. The container is adapted to be supported by the lift arm only through a pair of opposite support shafts. The mounting positions for the support shafts are considered higher than the center of the gravity so that the container may not be tilted during the cargo-work operation.

In order to load and unload the container, the arm main body is branched into a fork shape in the lift arm which is adapted to rotate forwardly and rearwardly. The root forms the supports for the container. The support shafts are mounted on the supports. As a result, the support shafts may rotatably slide by the supports while the lift arm is rotating forwardly and rearwardly, so that the posture of the container may be maintained. However, when the goods within the container, the accommodation position for the received or the weight distribution is not balanced, the container is adapted to be supported in the inclined posture from the beginning. When the cargo is loaded or unloaded in such a posture as described hereinabove, the container is oscillated and becomes unstable. The accommodated may collapse as the case may be. The goods may fall or fly away in the case of the container with no cover or ceiling being provided thereon.

In order to improve the disadvantages, one portion of the container to supported is necessary to be auxiliarily supported, when the lift arm is rotated forwardly, rearwardly, to prevent the posture of the container from being varied. In order to realize it, the construction is adopted wherein the auxiliary arm which rotates forwardly, rearwardly is provided on the body of the vehicle for the operative cooperation with the forward, rearward rotation of the lift arm through the container. However, as it is necessary for the auxiliary arm to be kept capable to singly rotate forwardly, rearwardly, the cylinder for the exclusive use of the auxiliary arm.

When the container is supported in such arrangements, ill influences are provided that the operation of one cylinder obstructs the operation of the other cylinder, which is different from the one cylinder is stroke amount, stroke speed. Accordingly, a controlling apparatus is desired which is capable of selectively switching the invertedly operational condition and the independently operational condition of the auxiliary cylinder in accordance with a case where the auxiliary arm is operatively cooperated in concert with the forward, rearward rotation of the lift arm or a case where the auxiliary arm is not operatively cooperated.

SUMMARY OF THE INVENTION

Accordingly, an object of the present invention is to provide a cargo-work vehicle provided with a controlling apparatus, which is capable of a cooperating action between the auxiliary arm for retaining the posture of the container during the loading, unloading operations and the lift arm rotating forwardly, rearwardly through the supporting of the container, and of an independent operation of the auxiliary arm, further of preventing the excessive load from being applied upon the auxiliary cylinder at the operative cooperation between the lift arm and the auxiliary arm so as to retain the posture of the container during the loading and unloading operations.

For the solution of the conventional problems, the present invention is a cargo-work vehicle which is characterized in that the lift arm loading and unloading the container through supporting the detachable container and the auxiliary arm retaining the posture of the container are respectively supported for the forward, rearward rotation on the body by the lift cylinder and the auxiliary cylinder. The cargo-work vehicle is provided with an arm forward, rearward rotation controlling means which is adapted to rotate the lift arm 5 and the auxiliary arm, and a pressure controlling means which makes the auxiliary cylinder be possible to be inverted in the integral forward, rearward rotation of the lift arm and the auxiliary arm in a condition where the container is supported by the lift arm and its posture is retained by the auxiliary arm.

When the container placed on the ground is loaded on a vehicle, the lift cylinder and the auxiliary cylinder receive signals from the arm forward, rearward rotation controlling means to independently extend so that the lift arm and the auxiliary arm may rotate rearwardly. When the lift arm is engaged to support the container and the auxiliary arm is connected with the container through the rearward rotation of both of the arms, the lift arm and the auxiliary arm are forwardly rotated integrally with the container. The auxiliary cylinder is put into an invertable non-operating condition by the pressure controlling means so that the operation of the auxiliary cylinder may not be obstructed by the lift cylinder, so that the auxiliary arm follows the forward rotation of the lift arm through the container to make the forward rotation. As the container forms a parallelogram link unit by the use of both the arms and the vehicle body, it is loaded into the body of the vehicle with the posture of the container being retained. Even when the loaded container is unloaded, the auxiliary cylinder is put into the inverted condition by the pressure controlling means. The lift arm and the auxiliary arm are rearwardly rotated by the extending operation of the lift cylinder with the posture of the container being retained thereby unloading the container from the vehicle.

As an arm forward, rearward controlling means, which causes the lift arm and the auxiliary arm to integrally and independently rotate forwardly and rearwardly, and a pressure controlling means, which causes the auxiliary cylinder to render inverted, are provided, the auxiliary cylinder may be put into an inverted non-operating condition by the pressure controlling means when the lift arm supports the container. When it does not support the container, the auxiliary cylinder may be put into an independently operable condition. Thus, in the non-operating condition of the auxiliary cylinder, the lift arm and the auxiliary arm are forwardly and rearwardly rotated in a cooperating action to prevent the excessive load from being applied upon the auxiliary cylinder, and the support posture is retained during the unloading operation of the container, thus ensuring the stable, smooth unloading operation without any oscillation.

Also, one preferred embodiment of the present invention is a cargo-work vehicle which is adapted to support a detachable container through the support formed at the end by a pair of lift arms provided rightwardly and leftwardly of the vehicle body, and is adapted to load and unload the container through the oscillation of the lift arms for the forward, rearward rotation by the operation of a hydraulic cylinder, a support rod forming the pivotal center of the lift arm is mounted on the body of the vehicle, a coupling rod connecting the right, left lift arms is provided in parallel to the support rod, the coupling rod is disposed in a position rearwardly from the container when the container is loaded on the vehicle body, the coupling rod is disposed in a position forwardly from the container when the container is unloaded outside of the body. The container is loaded on the body of the vehicle with the hydraulic cylinder being contracted, the coupling rod being located behind the container. The cargo-work vehicle runs to carry the container so as to unload it at the destination. In this case, the hydraulic cylinder is extended to cause a pair of lift arms, a coupling rod for connection and integration of them, a detachable container supported at the horizontal posture by the support to pivot around the support rod and to rotate rearwardly. Even in such a position, the container retains its horizontal posture and furthermore the position of the coupling rod is brought closer to the support rod. As the tip end of the lift arm is rendered shorter, the position of the tip end highest is considerably lower than it was. As the position of the coupling rod is moved downwardly from behind the container. The cargo-work vehicle runs to carry the container so as to unload it at the destination. In this case, the hydraulic cylinder is extended to cause a pair of lift arms, a coupling rod for connection and integration of them, a detachable container supported at the horizontal posture by the support to pivot around the support rod and to rotate rearwardly. Even in such a position, the container retains its horizontal posture and furthermore the position of the coupling rod is brought closer to the support rod. As the tip end of the lift arm is rendered shorter, the position of the tip end highest is considerably lower than it was. As the position of the coupling rod is moved downwardly from behind the container during the pivotal operation, the lift arm makes its rearward rotation without collision against the ceiling. With this continuous rearward rotation, the cargo is unloaded on the ground with such a posture as shown in the two-dot chain line. The position of the coupling rod, which is located before the container, does not obstruct the unloading operation and allows the new container to be loaded. In this embodiment, the support rod forming the pivotal center of the lift arm is mounted on the vehicle body, the coupling rod which connects the right and left arms is provided in parallel to the support rod. The coupling rod is disposed in a position rearward from the container when the container is loaded on the body, while it is disposed in a position forward from the container when the container is unloaded out of the vehicle, so that the pivotal track in the tip end on the upper side of the lift arm, and in the coupling rod through the loading and unloading operations of the container is considerably smaller than the conventional one. Accordingly, even in the container yard of a structure type which is restricted in the above space, the cargo-work apparatus is capable of smoothly loading and unloading the cargo within the construction, maintaining the horizontal posture of the container.

Another preferred embodiment of the present invention is a cargo-work vehicle which is adapted to support the detachable container by a pair of lift arms disposed on the right and left of the vehicle body and to load and unload the container through the oscillation of the lift arm for the forward and rearward rotation by the operation of the hydraulic cylinder. A dump pin which advances into the container side-wall hole through the lift arm and retreats from it is connected with the pivotal link mounted on the lift arm. The cylinder which causes the link to engage the link with the lift arm or disengage the link from the lift arm is accommodated within the lift arm, so that the dump pin is adapted to integrate the lift arm and the container and to separate the lift arm from the container by the operation of the cylinder. The container is supported by a pair of lift arms disposed on the right and left side of the vehicle body and the container with the goods includes therein is loaded on the body. The link pivots through the contraction of the cylinder and the dump pin moves into the container side-wall hole for insertion so as to integrate the container and the lift arm. After such a series of operations, the cargo-work vehicle runs with the container being secured to the vehicle body to carry it to the destination. When the hydraulic cylinder is extended at the destination, the oscillatable lift arm makes its rearward rotation, supporting the support shaft of the container by the support. At this time, the container assumes an approximately vertical posture so that the accommodated is unloaded rearwardly of the body. Contract the hydraulic cylinder and the lift arm, together with the container, makes its forward rotation so that the emptied container is restored onto the body.

The link is pivoted by the extension of the cylinder to cause the dump pin to be disengaged from the container side-wall hole to separate the container from the lift arm. When the hydraulic cylinder is extended in such a condition, the container is unloaded on the ground, maintaining the horizontal posture. In this embodiment, the dump pin which advances into the container side-wall hole through the lift arm or retreats from it is connected with the pivotal link mounted on the lift arm, the cylinder which causes the link to be attached to or detached from the lift arm is accommodated within the lift arm, so that the dump pin is adapted to integrate the lift arm and the container and separate the lift arm from the container through the operation of the cylinder. Thus, the protection may be rendered considerably smaller than the conventional one through admission of the dump pin into the container sidewall hole. As a result, the obstruction by the projection during the running operation of the vehicle is eliminated, thus allowing the container capacity to be correspondingly increased.

A further preferred embodiment of the present invention is to provide a cargo-work vehicle, wherein a support arm having the container support is provided for the forward and rearward rotation on both the sides of the rear of the body of the vehicle, an auxiliary arm having the container connection is provided for forward and rearward rotation on the front of the vehicle, a coupling rod is provided between both of the arms so as to form the parallelogram by the pivotal center of both of the arms, the container support, the container connection, and to form the parallelogram by the pivotal center of both of the arms, the coupling of both ends of the coupling rod to provide a driving means for pivotal use on one of both of the arms.

BRIEF DESCRIPTION OF THE DRAWINGS

This object and feature of the present invention will become apparent from the following description taken in conjunction with the preferred embodiments thereof with reference to the accompanying drawings, in which:

FIG. 1 is a side view for illustrating the construction of a cargo-work apparatus in a cargo-work vehicle of the present invention;

FIG. 2 is a plan view in one example of the cargo-work vehicle;

FIG. 3 is a coupling mechanism view between an auxiliary arm and a container by an insertion pin;

FIG. 4 is a view for illustrating the operation in a case where the container is dumped;

FIG. 5 is a slipping on/off mechanism view of the dump pin;

FIG. 8(a) is a forward rotation condition view of a cargo-work apparatus with the container being not loaded;

FIG. 8(b) is a view for illustrating the operation showing a condition where the container on the ground starts to be loaded or the container has been unloaded on the ground;

FIG. 13 is a view for illustrating the construction of a cargo-work apparatus in the cargo-work vehicle to which the present invention is applied;

FIG. 15 is a plan view in one example of the cargo-work vehicle;

FIG. 19(a) is a forward rotating condition of the cargo-work apparatus with the container being not loaded;

FIG. 19(b) is a view for illustrating the operation showing a condition where the container on the ground starts to be loaded or a condition where the container has been unloaded on the ground;

DETAILED DESCRIPTION OF THE INVENTION

Figure 6:
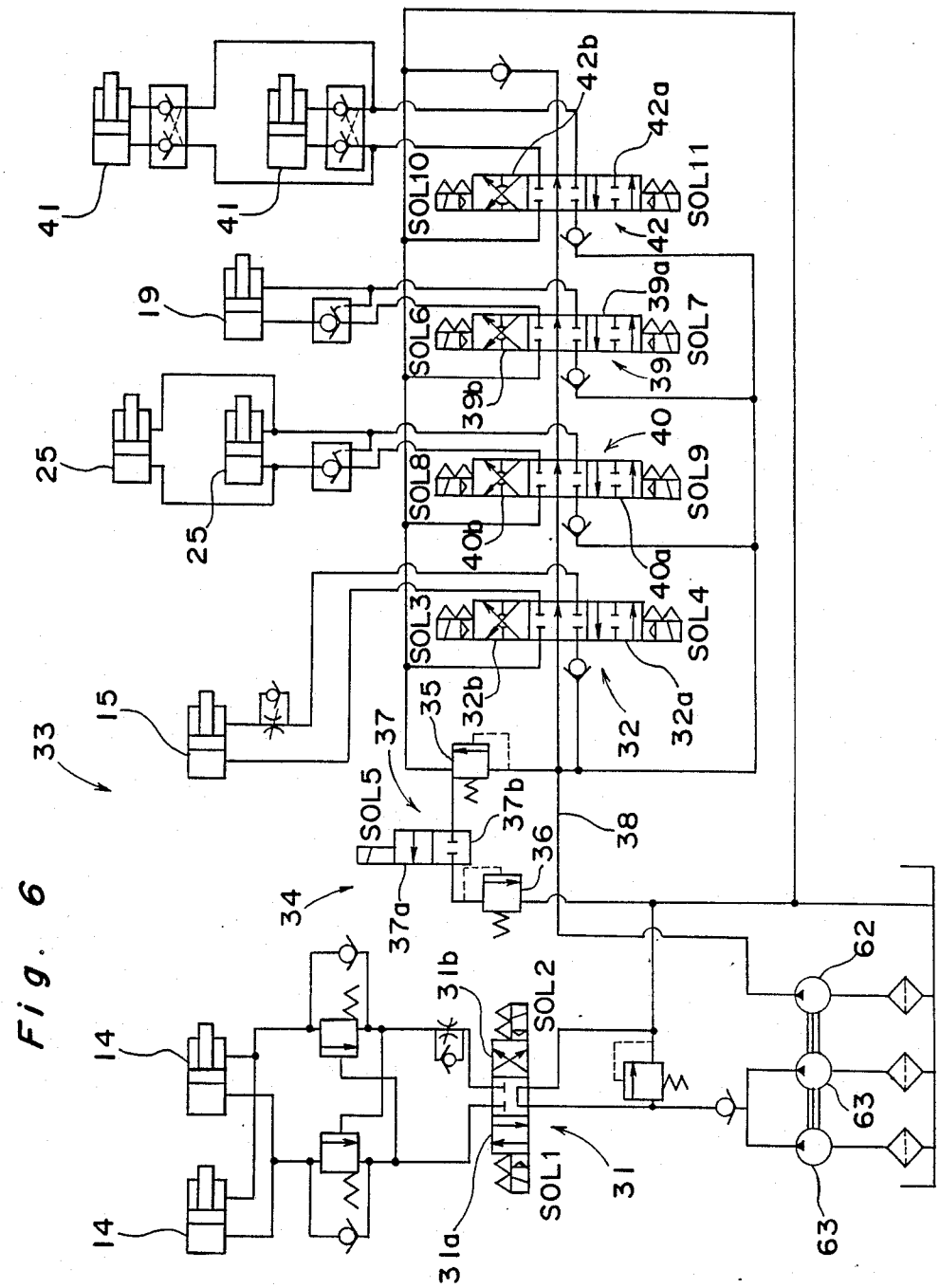
FIG. 6 is a hydraulic circuit diagram for operating a hydraulic actuator.

Before the description of the present invention proceeds, it is to be noted that like parts are designated by like reference numerals throughout the accompanying drawings.

(First Embodiment)

Referring now to the drawings, there is shown in FIGS. 1 through 8 a first embodiment according to the present invention. FIG. 1 shows one example of the cargo-work vehicle. The container 3 which may be freely engaged with or disengaged from the cargo-work apparatus 2 is adapted to be unloaded on the body. A pair of opposed lift arms 5 (see FIG. 2) which are adapted to unload the container 3, supporting it and one auxiliary arm 6 which is adapted to retain the posture of the container 3 are supported on the body of the vehicle 4 for forward and rearward rotation respectively around the support shafts 7 and 8.

The main body tip-end side of the lift arm 5 is branched into a fork shape. The root is engaged with the support shaft 9 projected rightwardly and leftwardly of the container 3 to form the support 10 supporting the container 3. The support shaft 9 is mounted in a position above the gravity center of the container 3 and is placed on the support 10 during the cargo-work operation. It is to be noted that the posture of the container 3 is not influenced by the forward and rearward rotation of the lift arm 5 with the support shaft 9 being in the rotatable sliding contact by the support 10 during the forward and rearward rotation of the lift arm 5. The forked tip end on the upper side is extended as far as the position which does not interfere with the container 3. In order to improve the rigidity through the integration of the right and left lift arms 5, 5, the coupling shaft 11 is mounted.

The above described auxiliary arm 6 is bent in the shape of <. An insertion pin 12 which may advance or retreat freely is engaged with the tip end. It is adapted to be inserted into a side hole 24 (described later) of the bracket 13 mounted on the front-end upper portion of the container 3. The auxiliary arm may be rendered rectilinear when it is provided on the right, left of the vehicle body 4. The posture of the container is required to be retained through connection with one portion of the container 3 without any interference with the container 3 to be unloaded. The lines connecting the support shafts 7 and 8, the support 10 and the insertion pin 12 are selected in advance in the respective mounting position to form a parallelogram.

The above-described two arms 5 and 6 are adapted to provide the forward and rearward rotation by the expanding operation of the hydraulic cylinders 14 and 15 which are oscillatably engaged with the body 4. The tip ends of the respective piston rods are mounted on both the arms 5 and 6 through the pins 16 and 17. The lift arm 5 and the auxiliary arm 6 rearwardly rotates as far as the position of the imaginary line through the extension of the piston rod. An out-rigger 18 is provided on the right and left of the rear portion of the vehicle body 4. The body 4 is prevented from assuming the head raising posture because of the weight applied in the unloading operation of the container 3 through the cargo-work apparatus 2.

The mechanism for coupling the auxiliary arm 6 to the container 3 with the insertion pin 12 is composed of a cylinder 19 and a °-shaped link 20 as shown in FIG. 3. When the link 20 is oscillated with a support point 21 mounted on the arm 6 as a center, the insertion pin 12 is adapted to move into or out of the hole 22 of the bracket 13.

Such a cargo-work apparatus as described hereinabove is adapted to erect the container 3 loaded on the body 4 so that the accommodated load only may be unloaded rearwardly of the body as shown in FIG. 4. Thus, a dump pin 23 which tilts the container 3 is provided in the right and left lift arms 5. A side hole 24 into which the dump pin 23 is engaged is formed in the belly of the container 3 as shown in FIG. 5. The dump pin 23 is adapted to tilt the container 3 through the operative cooperation with the support 10, which has the support shaft 9 of the container 3 provided therein. When the dump pin 23 is engaged into the side hole 24, the above-described pin 12 of the auxiliary arm 6 is drawn out from the hole 22 of the bracket 13 of the container. The slipping on/off mechanism of the dump pin 23 is composed of a cylinder 25 and a <-shaped link 26. When the link 26 is oscillated with a support point 27 mounted on the lift arm 5 as the center, the dump pin 23 moves into or out of the side hole 24.

A limit switch for detecting the respective position or condition is engaged with each link or link in the above-described cargo-work apparatus 2.

First, as shown in FIG. 1, limit switches LS1 and LS2, which are adapted to detect through the contact with the arm that the lift arm 5 is located in the forward rotation position, are provided respectively on the right and left. A limit switch LS3 which is adapted to detect through the contact with the arm that the auxiliary arm 6 is located in the forward rotation position, and a limit switch LS4 which is adapted to detect through the contact with the arm that it is located in the rearward position, are disposed respectively on the front portion and the middle portion of the cargo space. A limit switch LS5 which detects that the insertion pin 12 is engaged into the hole 22, and a limit switch LS6 which detects that the insertion pin 12 is completely drawn out, are provided as shown in FIG. 3, at the tip end of the auxiliary arm 6. The right and left limit switches LS7 and LS8 which detect that the dump pin 23 is engaged into the side hole 24, and the limit switches LS9 and LS10 which detect that the dump pin 23 is completely drawn out are provided, as shown in FIG. 5, on the lift arm 5. As shown in FIG. 1, there are limit switches LS11 and LS12 for detecting the extension of the hydraulic jack (not shown) which supports the vehicle body 4 through the extension of the out-rigger 18 onto the ground. There are limit switches LS13 and LS14 which detect the construction. In addition, there is provided a limit switch LS15 (see FIG. 1) which detects through movement of lift arm 5 container inclining limit when the container 3 is tilted as in FIG. 4 to unload the accommodated load.

The functional position of the electromagnetic valve is switched in accordance with the detection signals from such many limit switches. The hydraulic cylinder and hydraulic jack which operate each arm, link, etc. are incorporated in such a circuit as described in FIG. 6. The lift cylinders 14, which forwardly and rearwardly rotate the lift arm 5 are connected with the electromagnetic valve 31 to be switched through the excitation of the solenoids SOL1 and SOL2, so that the other hydraulic cylinder or the like becomes an independent hydraulic circuit. The auxiliary cylinder 15 which forwardly and rearwardly rotates the auxiliary arm 6 is connected with an electromagnetic valve 32 to be switched through the excitation of the solenoids SOL3 and SOL4. The two hydraulic circuits which constitute an arm forward and rearward driving portion 33 receives the signal from the arm forward and rearward rotation controlling means 56 to contract each of the cylinders 14, 15. A pressure switching portion 34 which causes the auxiliary cylinder 15 to become invertable is disposed in the hydraulic circuit for operating the auxiliary cylinder 15 when the left arm 5 and the auxiliary arm 6 are integrally rotated forwardly and rearwardly in a condition where the container 3 is supported by the lift arm 5 and the posture is retained by the auxiliary arm 6. This is composed of a relief valve 35 of high-pressure set, a relief valve 36 of low-pressure set, and an electromagnetic valve 37. The feed oil passage 38 of the operation oil is disposed in the order of the relief valve 35, the electromagnetic valve 37, and the relief valve 36. Accordingly, the operation pressure is regulated to the high set-pressure of the relief valve 35 when the electromagnetic valve 37 assumes its opening position 37a. When the lift arm 5 and the auxiliary arm 6 unload the container 3 through their operative cooperation, the solenoid SOL5 is excited so that the position becomes a functional position 37a, and the pressure of the operation oil flowing through the feed oil passage 38 is lowered. In such case, cylinder 15 does not expand positively by the operation oil-pressure although the operation oil is fed to the auxiliary cylinder 15. The auxiliary cylinder expands through the expansion of the lift cylinder 14. During this period, only operation oil is fed to the piston chamber, so that the excessive load does not work upon the auxiliary cylinder 15. When the electromagnetic valve 37 assumes its opening position 37a without provision of the relief valve 36, the feed oil passage 38 may be kept to become higher in air pressure.

The cylinder 19 for the insertion pin 12 is connected with the feed oil passage 38 through the electromagnetic valve 39 to be switched through the excitation of the solenoids SOL6 and SOL7. The cylinders 25, for the dump pin 23 are connected through the electromagnetic valve 40 to be switched through the excitation of the solenoids SOL8 and SOL9. The hydraulic jacks 41, for the outrigger 18 are also adapted to be expanded and contracted with the operation oil to be fed through the electromagnetic valve 42 to be switched through the excitation of the solenoids SOL10 and SOL11.

Figure 7A:
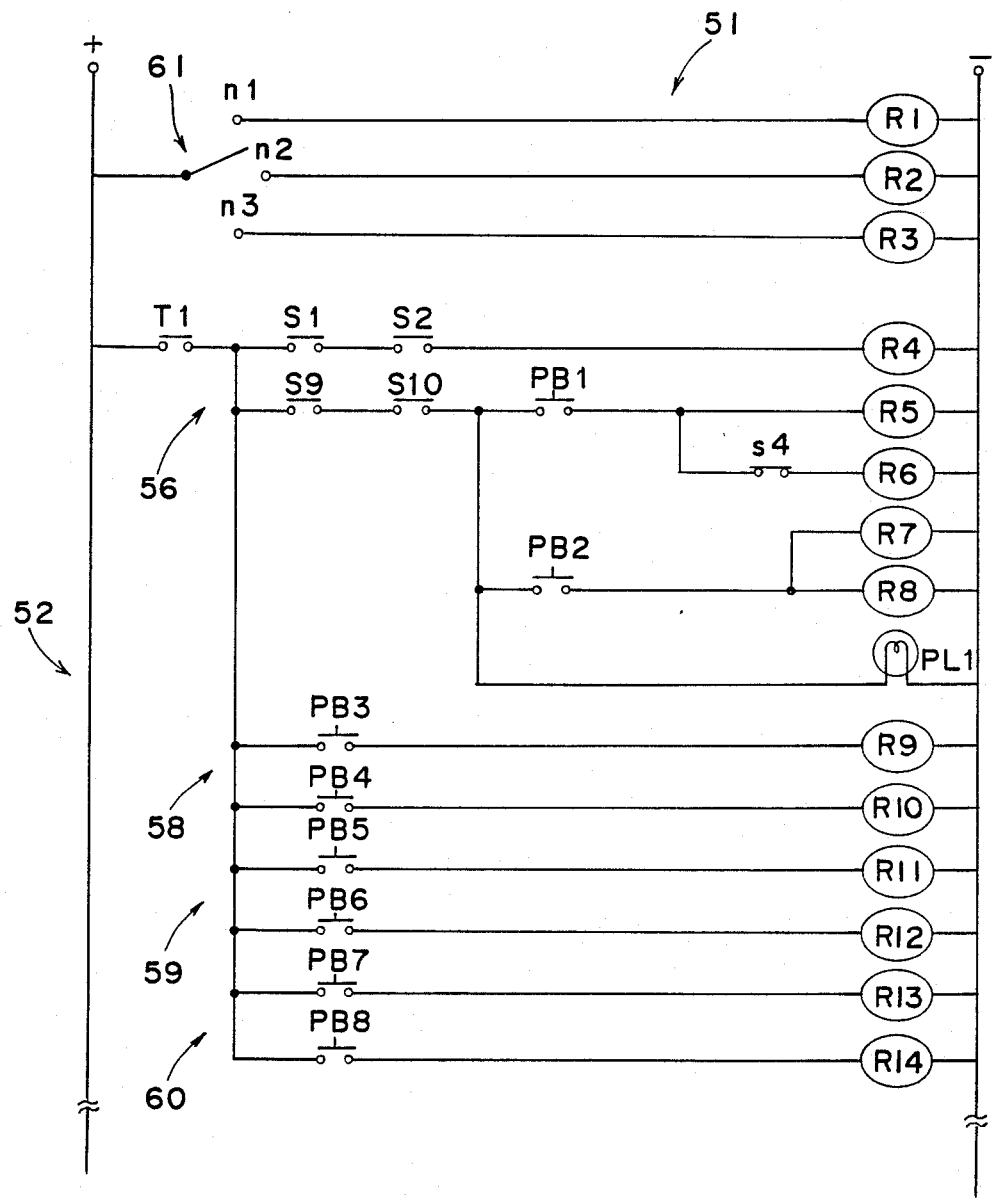
FIGS. 7(a) through 7(c) are relay circuit diagrams including an arm forward/rearward rotation controlling means and a pressure controlling means.
Figure 7B:
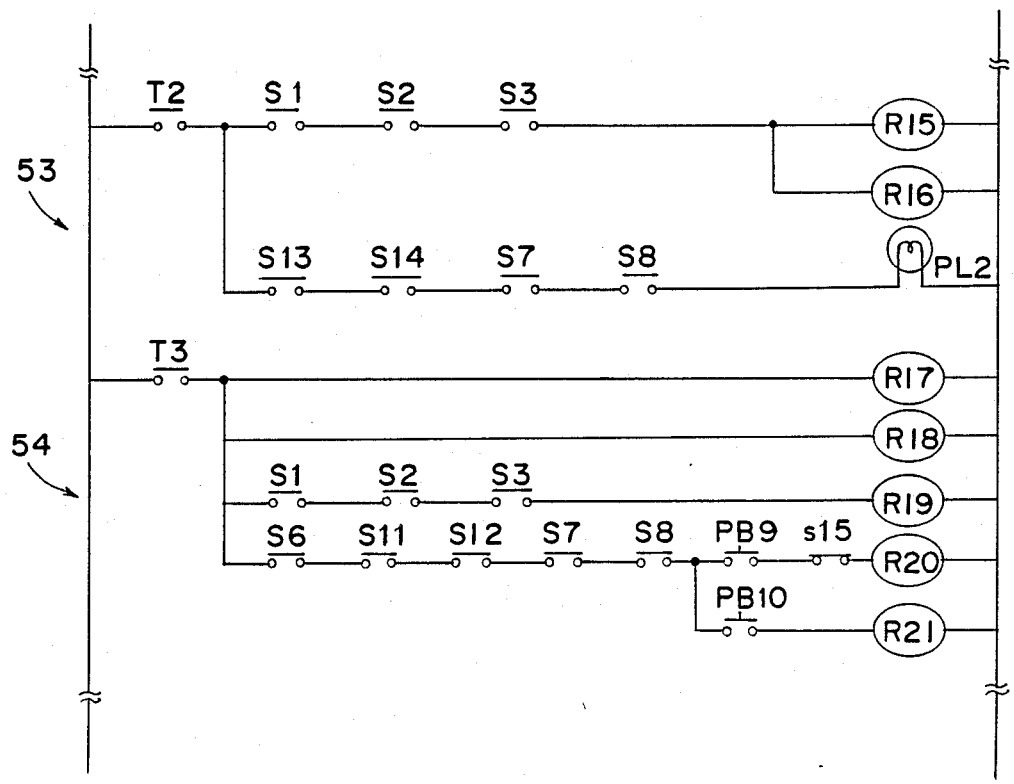
Figure 7C:
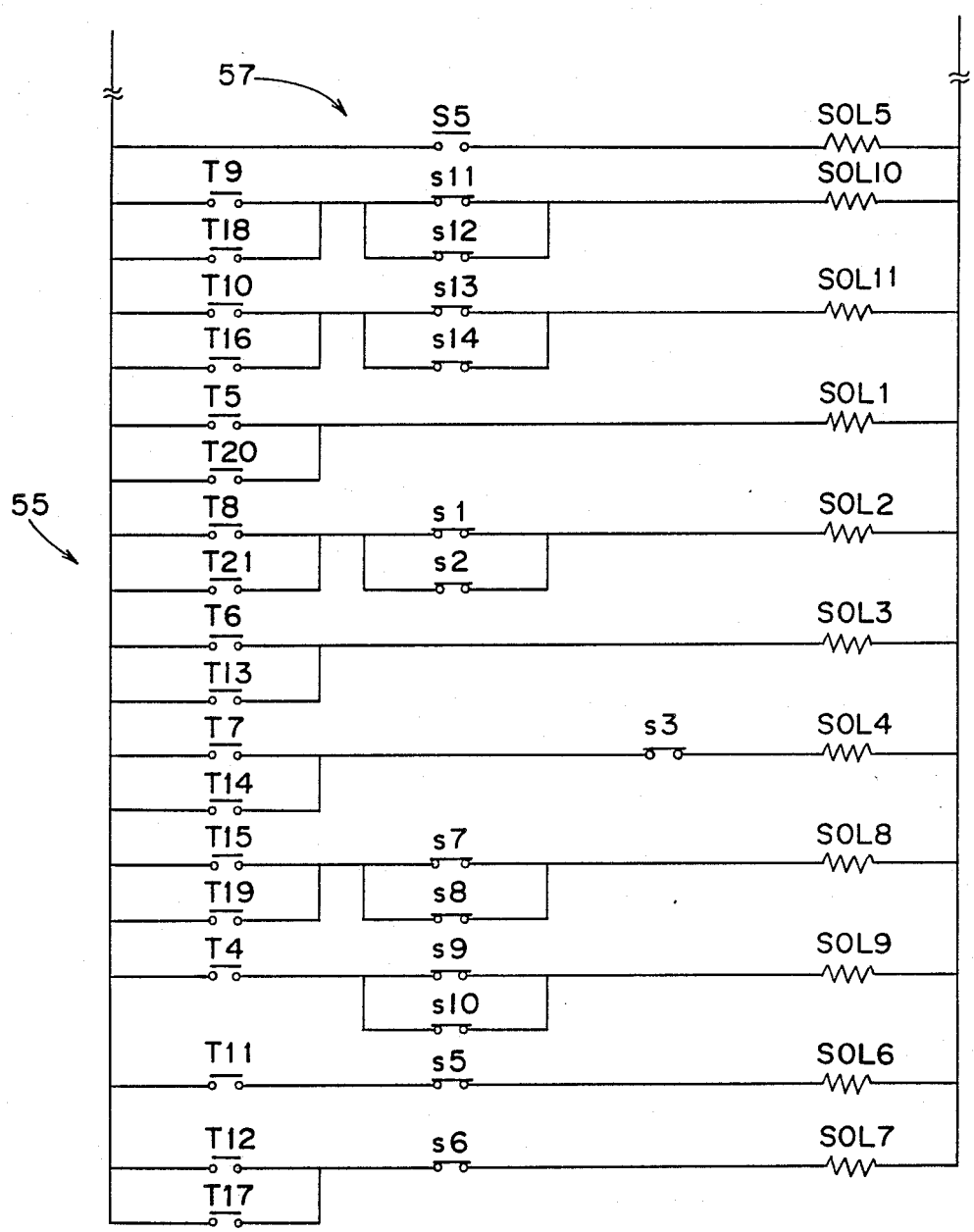

The excitation or demagnetization of the solenoid which switches the functional position of each magnetic valve in such a hydraulic circuit is performed by such a controlling circuit as shown in FIGS. 7(a) through 7(c). Although the present circuit is shown in a relay circuit for easier understanding, a microcomputer using digital ICs may be, needless to say, adopted. The circuit construction is, explained in order, selection circuit 51 of the operation embodiment, a container engagement and disengagement circuit 52, a travelling circuit 53, a dump circuit 54, and a solenoid exciting circuit 55 for exciting the solenoid of the electromagnetic valve through the energization of the respective circuits. The container engagement and disengagement circuit 52 includes an arm forward and rearward rotation controlling means 56, while the solenoid exciting circuit 55 includes a pressure controlling means 57. The respective circuits comprise a normally open contact or a normally closed contact, which connects or cuts off by the operation of each of the limit switches, a relay to be energized by the operations, a normally open contact to be connected by the relay. The arm forward and rearward rotation controlling means 56 transmits a signal which expands and contracts the lift cylinder 14 and the auxiliary cylinder 15 for the forward and rearward rotation of the lift arm 5 and the auxiliary arm 6, no matter whether the cargo-work apparatus 2 supports the container 3. The pressure controlling means 57 transmits a signal, which causes the auxiliary cylinder 6 to become inverted when the lift arm 5 and the auxiliary arm 6 are integrally caused to rotate forwardly and rearwardly in a condition where the container 3 is supported by the lift arm 5 and its posture is retained by the auxiliary arm 6. As a result, the arm forward and rearward rotation driving-portion 33 is operated upon receipt of the signal from the arm forward and rearward controlling means 56, and the feed operation oil to the auxiliary cylinder 15 is switched to become lower in pressure by a pressure switching portion 34 upon receipt of a signal from the pressure controlling means 57. It is to be noted that the container engagement and disengagement circuit 52 has an expansion and contraction controlling means 58 of a hydraulic jack 41, an engagement and disengagement means 59 of the insertion pin and a single forward and rearward rotation controlling means 60 of the auxiliary arm 6.

In the container engagement and disengagement circuit 52, there are push buttons PB1 and PB2 by which an operator commands the forward rotation and the rearward rotation of the lift arm 5, push buttons, PB3 and PB4 by which the operator commands the extension and retraction operations of the out-rigger 18, push buttons PB5 and PB6 by which the operator commands the engagement and disengagement of the insertion pin 12, and push buttons PB7 and PB8 by which the operator commands the forward and rearward rotation of the auxiliary arm 6. These push buttons are arranged collectively in positions where the operator finds it easy to operate the buttons. The dump circuit 54 has push buttons PB9 and PB10 by which the operator commands the engagement and disengagement of the dump pin 23, with the push buttons PB9 and PB10, together with the above-described other push buttons, are set on the control panel.

The cargo-work operation by the cargo-work apparatus, the control circuit constructed as described hereinabove, the hydraulic actuator operated by them, and so on will be described hereinafter.

Figure 8C:
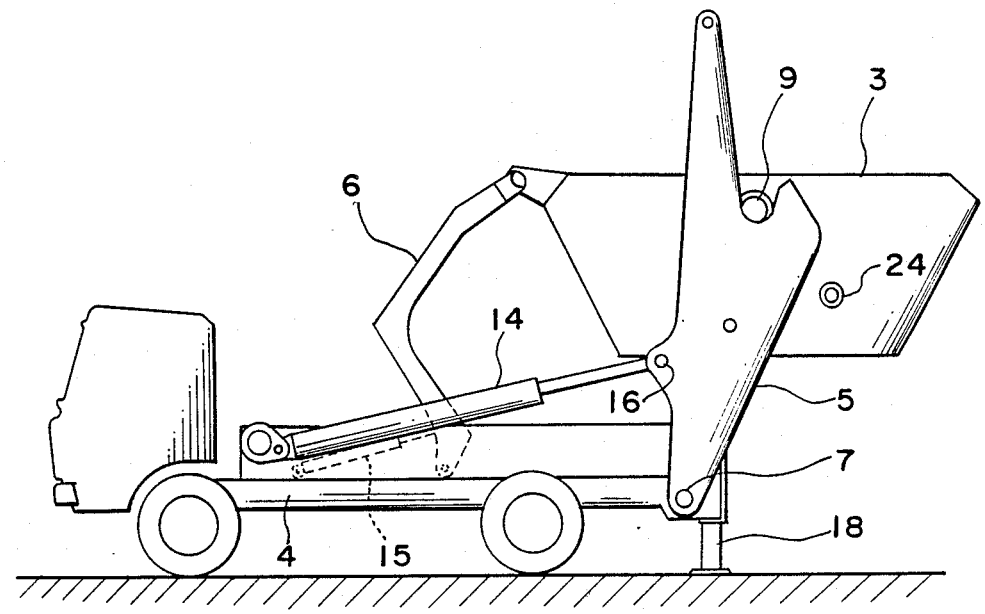
FIG. 8(c) is an operating condition view wherein the container is unloaded, being retained horizontally.

(1) The container 3 is apart from the body 4 as shown in FIG. 8(a). A case will be described in which the container 3 on the ground is as in FIG. 8(b) is loaded by a series of operations of FIGS. 8(a) through 8(d).

The lift arm 5 and the auxiliary arm 6 are forwardly rotated on the body 4, the lift cylinder 14 and the auxiliary cylinder 15 are contracted. As each of the arms 5 and 6 assumes its forward-rotation posture, the limit switches LS1, LS2 and LS3 are on, the normally open contacts S1, S2 and S3 are connected corresponding to them in the relay circuit. When the operator turns the selection switch 61 in the selection switch 51 into the contact n1, the relay R1 is excited, the normally open contact T1 of the container engagement and disengagement circuit 52 is connected. If the dump pin 23 is advanced into the lift arm 5, it interferes when the container 3 on the ground is supported, so that the dump pin 23 is evacuated. Namely, one of the limit switches LS9 and LS10 shown in FIG. 5 becomes off when at least one of the dump pins 23 is inserted though the container 3 is not supported by the lift arm 5, so that the normally closed contact s9 or s10 of the solenoid exciting circuit 55 retains its connection. The relay R4 is energized by the connection of the above-described contacts T1, S1, S2 whereby the normally open contact T4 of the solenoid exciting circuit 55 is connected. The solenoid SOL9 is excited through the contact S9 or S10 connected, the electromagnetic valve 40 in FIG. 6 is switched into the functional position 40a from the neutral. The cylinder 25 extended is contracted by the operation oil discharged from the hydraulic pump 62, so that the dump pin 23 is evacuated. After the dump pin is completely evacuated, the link 26 turns on the limit switches LS9 and LS10 so that the normally closed contacts s9 and s10 restore to the cut-off condition. As the solenoid SOL9 is demagnetized, the electromagnetic valve 40 restores to the neutral position to stop the contraction of the cylinder 25 so that the dump pin 23 is retained at its evacuation position. In this condition, the limit switches LS9 and LS10 are on, so that the normally open contacts S9 and S10 of the arm forward and rearward rotation controlling means 56 connects. When the operator depresses the push button PB1, the relay R5 is energized to excite the solenoid SOL1 through the connection of the normally open contact T5. The electromagnetic valve 31 is switched to the functional position 31a to extend the lift cylinder 14 with the operation oil from the hydraulic pump 63 to cause the lift arm 5 to rearwardly rotate around the support shaft 7. As the auxiliary arm 6 is also rotated forwardly, the limit switch LS4 is off, the relay R6 is energized through connection of the normally closed contact s4. The solenoid SOL3 is excited through connection of the normally open contact T6, the electromagnetic valve 32 is switched to the functional position 32b. The auxiliary cylinder 15 is extended with the operation oil from the hydraulic pump 62 so that the auxiliary arm 5 is rearwardly rotated around the center. Although both the arms 5 and 6 rearwardly rotate so long as the push button PB1 is kept depressed, the limit switch LS4 becomes on upon the rearward rotation of the auxiliary arm 6 by a given amount. Thus, the normally closed contact s4 is cut off to interrupt the energization of the relay R6 to restore the electromagnetic valve 32 to the neutral position so as to stop the rearward rotation of the auxiliary arm 6. In order to stop the rearward rotation of the lift arm 5, release the push button PB1 to interrupt the energization of the relay R5. It is to be noted that the push button PB1 is turned off at a time point when the support portion 10 of the lift arm 5 comes to a position where the support portion 10 of the lift arm 5 can support the support shaft 9 of the container 3 on the ground.

The vehicle body 4 may be rearwardly rotated under this condition until the support shaft 9 is engaged with the support portion 10 of the lift are 5 as shown in FIG. 8(b). At this time, it does not follow that the auxiliary arm 6 is rotated rearwardly to an extent the insertion pin 12 mounted on the auxiliary arm 6 is engaged into the hole 22 of the bracket 13 of the container 3. Thus, the operator depresses the push button PB7 or PB8 of the single forward and rearward rotation control portion 60 to finely adjust the rearward rotating position of the auxiliary arm 6. When the push button PB7 is depressed, the normally open contact is connected with the energization of the relay R13. The solenoid SOL3 is excited to extend the auxiliary cylinder in the same manner as described hereinabove. Release the push button PB7 and the auxiliary arm 6 comes to a stop at this position. On the other hand, when the auxiliary arm 6 rearwardly rotates excessively, it is forwardly rotated to restore it to a position corresponding to the hole 22. At this time, the push button PB8 is depressed and the normally open contact T14 is connected by the energization of the relay R14. As the auxiliary arm 6 does not turn on the limit switch LS3, the normally closed contact s3 is connected and the solenoid SOL4 is excited. The electromagnetic valve 32 is switched to the functional position 32a, and the auxiliary cylinder 15 is contracted to forwardly rotate the auxiliary arm 6. When the insertion pin 12 mounted on the auxiliary arm 6 in this manner is adjusted to conform to the hole 22 of the bracket 13, the push button PB5 of the engagement and disengagement controlling portion 59 is depressed and the auxiliary arm 6 is connected with the container 3 by the insertion pin 12. Namely, the relay R11 is energized and the normally open contact T11 is connected. As the insertion pin 12 is drawn out, the limit switch LS5 is off. The solenoid SOL6 is excited with the normally closed contact s5 being connected, the electromagnetic valve 39 is switched to the functional position 39b. The cylinder 19 is extended with the operation oil from the hydraulic pump 62 and the insertion pin 12 is engaged into the hole 22 of the bracket 13 through the link 20. When the limit switch LS5 is turned on by the pivotal operation of the link 20, the normally closed contact s5 is cut off. The solenoid SOL6 is de-magnetized to stop the extension of the cylinder 19.

Then, in order to prevent the body 4 from raising the head when the container 3 is supported, the operator extends the out-rigger 18 as shown in FIG. 8(c). When the push button PB3 of the expansion control portion 58 is kept depressed, the relay R9 is energized during this period. As the limit switch LS11 or LS12 is not turned on at least unless the right or left hydraulic jacks 41 extends completely, the normally closed contact s11 or s12 is connected. Accordingly, the solenoid SOL10 is excited, the electromagnetic valve 42 is switched to the functional position to extend the hydraulic jack 41. When the right and left out-riggers 18 extend enough to support the ground, the limit switch LS11 or LS12 is turned on, and the normally closed contact s11 or s12 is cut off. The solenoid SOL10 is magnetized to restore the electromagnetic valve 42 to the neutral position so as to stop the extension of the hydraulic jack 41.

When the container 3 is ready to be loaded on the body 4 in this manner, the operator depresses the push button PB2 of the arm forward and rearward rotation controlling means 56 to forwardly rotate the lift arm 5 and the auxiliary arm 6. As the dump pin 23 is drawn out from the side wall 24 of the container 3 as described hereinabove, the limit switches LS9 and LS10 are turned on, the normally open contacts S9 and S10 are connected to light a safety lamp PL1. The operator sees the light to confirm that he may load the container 3 on the body 4, retaining the posture without dumping the container. As described hereinabove, the insertion pin 12 is advanced into the hole 22 of the bracket 13, the normally open contact S5 of the pressure controlling means 57 is connected with the limit switch LS5 being on so that the electromagnetic valve 37 assumes its functional position 37a through excitation of the solenoid SOL5. As a result, the discharge pressure of the operation oil to be discharged from the hydraulic pump 62 is regulated by a relief valve of low pressure set, the auxiliary cylinder 15 is operated through the extremely low operation oil-pressure of, for example, about 10 kg/cm$^2$. The pressure is one sufficient enough to feed the operation oil into the piston chamber on the side the negative pressure operates when the auxiliary cylinder with the load not being applied is operated, or the piston rod is forced to be pushed or pulled by the external force. Accordingly, the auxiliary cylinder 15 is placed in an inverting condition. The condition is one where the operation is performed, following the lift cylinder 14 operating by the powerful force. When the push button PB2 is pushed by this condition, the relays R7 and R8 are energized, the normally open contacts T7 and T8 of the solenoid exciting circuit 55 are connected. As the auxiliary arm 6 is not forwardly rotated, the limit switch LS3 is off. The normally closed contact s3 is connected to excite the solenoid SOL4. On the other hand, as the lift arm 5 is not rotated forwardly either, the limit switches LS1 and LS2 are off, and the normally closed contacts s1 and s2 are connected to excite the solenoid SOL2. Accordingly, the electromagnetic valve 32 assumes its functional position 32a, the electromagnetic valve 31 assumes a functional position 31b. The operation oil is fed so that both the lift cylinder 14 and the auxiliary cylinder 15 may be contracted. As the auxiliary cylinder 15 which is generally smaller as compared with the lift cylinder 14 is adopted, the stroke amount or the stroke speed is often the same. When the auxiliary cylinder 15 is inverted as described hereinabove, the auxiliary cylinder 15 is moved through the lift arm 5 to be forwardly and rearwardly rotated by the operation of the lift cylinder 14, the container 3 supported by it and the auxiliary arm 6 connected with it as shown in FIG. 8(c). Namely, the auxiliary cylinder 15 is stroked by the lift cylinder 14 without the positive operation. As the operation oil of the low pressure is fed during this period, it prevents the negative pressure from being included within the auxiliary cylinder 15. Accordingly, the operation modulation of the auxiliary cylinder, the excessive operation oil pressure, which would occur when both the cylinders 14 and 15 positively operated are avoided. As the container 3 constitutes a parallelogram link unit with a lift arm 5, a body 4 and an auxiliary arm 6, the support posture of the container 3 is maintained to the original level and is loaded on the body 4.

Figure 8D:
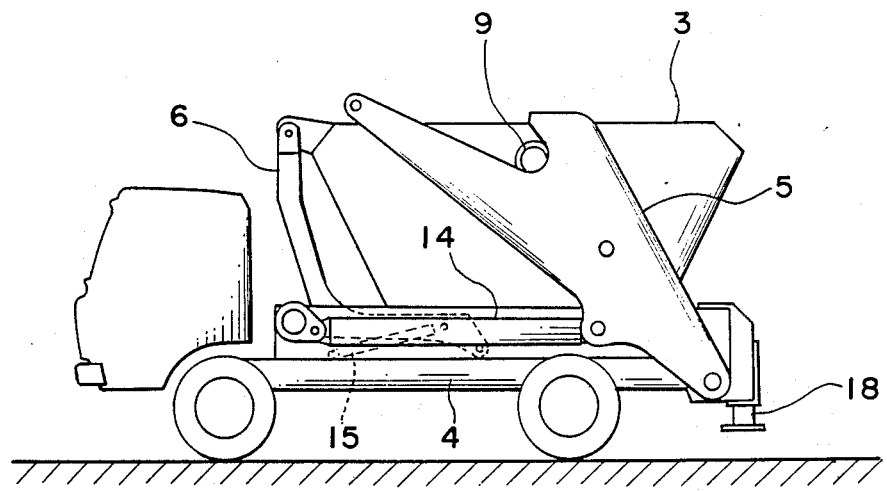
FIG. 8(d) is a view for illustrating the operation showing a condition where the container is loaded on the body of the vehicle.

When the lift arm 5 is forwardly rotated completely as shown in FIG. 8(d), the limit switches LS1 and LS2 become on to cut off the normally closed contacts s1 and s2. Also, when the auxiliary arm 6 is forwardly rotated completely, the limit switch LS3 becomes on to cut off the normally closed contact s3. As a result, if the operator keeps pushing the push button PB2, the solenoids SOL2 and SOL4 are de-magnetized. The electromagnetic valve 31 and 32 become neutral in position to stop the contracting operation of both the cylinders 14 and 15.

(2) A case where the container 3 is loaded on the body 4 as shown in FIG. 8(d), and then driven towards the destination from the container yard, etc. will be described hereinafter.

As the lift arm 5 and the auxiliary arm 6 rotate forwardly on the body with the lift cylinder 14 and the auxiliary cylinder 15 being contracted, the limit switches LS1, LS2 and LS3 are on and the normally open contacts S1, S2 and S2 of the running circuit 53 are connected. When the operator switches the selection switch 61 in the selection circuit 51 to the contact n2, the relay R2 is excited to connect the normally open contact T2 of the running circuit 53. As a result, the relay R15 is energized to connect the normally open contact T15. As described hereinabove, the dump pin 23 is drawn out so that the limit switches LS7 and LS8 are off to excite the solenoid SOL8 with the normally closed contact s7 and s8 being connected. The electromagnetic valve 40 assumes a functional position 40b, the cylinder 25 is extended to engage the dump pin 25 into the side hole 24 of the container 3. When the link 26 turns on the limit switches LS7 and LS8, the normally closed contacts s7 and s8 are cut off to stop the extension of the cylinder 25. Accordingly, the container is under constrained condition on the body 4 by the support 10, the insertion pin 12 and the dump pin 23. The relay R16 is also energized simultaneously with such operation to connect the normally open contact T16. As the out-rigger 18 is extended, the limit switches LS13, and LS14 are off and the normally closed contacts s13 and s14 are connected. As a result, the solenoid SOL11 is excited, and the electromagnetic valve 42 assumes a functional position 42a. The hydraulic jack 41 contracts and is evacuated. When it is evacuated as far as the accommodated position, the limit switches LS13 and LS14 are turned on to cut off the normally closed contacts s13 and s14, and the electromagnetic valve 42 returns to the neutral position to stop the contraction of the hydraulic jack 41. When the limit switches LS13 and LS14 and the limit switches LS7 and LS8 are turned on, the normally open contacts S13 and S14 and S7 and S8 are connected to light the safety lamp PL2. The driver can prevent the starting operation in the unstable condition through the confirmation of the lighting.

(3) A case will be described where only the accommodated load is unloaded with the container 3 on the body 4 being approximately vertical in posture as shown in FIG. 4.

An operator switches the selection switch 61 in the selection circuit 51 to a contact n3. The relay R3 is excited, the normally open contact T3 of the dump circuit 54 is connected to immediately energize the relays R17 and R18. As the insertion pin 12 is engaged into the hole 22 of the bracket 13, the limit switch LS6 is off with the normally closed contact s6 being connected. As a result, the solenoid SOL7 is excited, the electromagnetic valve 39 assumes the functional position 39a. The cylinder 19 contracts and the insertion pin 12 is drawn out of the hole 22. When the insertion pin is completely pulled out, the limit switch LS6 turns on so that the normally closed point s6 is cut off to stop the contraction of the cylinder 19. As the limit switch LS5 turns off, the normally open contact S5 of the pressure control means 57 is cut off. The solenoid SOL5 is de-magnetized, the electromagnetic valve 37 assumes a functional position 37b. The operation oil in the feed oil passage 38 becomes high in pressure regulated by the relief valve 35. The solenoid SOL10 is excited from the connection of the normally open contact T18 in parallel to such an action so as to extend the out-rigger 18.

As the lift arm 5 rotates forwardly, the limit switches LS1 and LS2 turn on. If the dump pin 23 is not engaged into the side hole 24 of the container 23, the relay R19 is energized by the connection between the normally open contacts S1 and S2, the solenoid SOL8 is excited by the connection of the normally open contact T19 so that the cylinder 25 is extended and the dump pin 23 is engaged into the side hole 24. As the insertion pin 12 is completely evacuated, the limit switch LS6 turns on to connect the normally open contact S6. As the out-rigger 18 is extended, the limit switches LS11 and LS12 are turned on to connect also the normally open contacts S11 and S12. As the dump pin 23 is engaged, the limit switches LS7 and LS8 are turned on to connect the normally open contacts S7 and S8. When the operator depresses the push button PB9 to command a dump up, the relay R20 is energized through a normally closed contact s15 which retains the connection condition until the container inclining limit. When the normally open contact T20 is connected, the solenoid SOL1 is excited to extend the lift cylinder 14. The electromagnetic valve 32 which operates the auxiliary cylinder 15 remains retained in the neutral position, the auxiliary arm 6 does not move from the forward rotation position. Though the lift arm 5 rotates forwardly around the support shaft 7, the container 3 is supported by the support 10 and the dump pin 23 at this time. Thus, the support posture of the container changes and is tilted until it is erected straight as shown in FIG. 4. When the lift arm 5 rotates rearwardly till the container inclination limit, the limit switch LS15 turns on to cut off the normally closed contact s15. If the push button PB9 is kept depressed, the extending operation of the lift cylinder 14 stops.

When the accommodated load is unloaded, the operator pushes the push button PB10 to command the dump down. The relay R21 is energized to connect the normally open contact T21. The solenoid SOL2 is excited to contract the lift cylinder 14. The lift arm 5 forwardly rotates around the support shaft 7 and the container is restored to its original posture. When the lift arm 5 turns on the limit switches LS1 and LS2, the normally closed contacts s1 and s2 are cut off to de-magnetize the solenoid SOL2, whereby the contracting operation of the lift cylinder 14 is stopped.

(4) Finally, a case will be described where the container 3 is loaded on the car 4 as shown in FIG. 8(d) and where the container is unloaded on the ground as shown in FIGS. 8(b) and 8(c)

As the lift arm 5 and the auxiliary arm 6 assume the forward rotation posture, the limit switches LS1, LS2 and LS3 are on with the normally open contacts S1, S2 and S3 are connected. When the operator switches the selection switches 61 in the selection circuit 51 to the contact n1, the relay R1 is excited to connect the normally open contact T1 of the container engagement and disengagement circuit 52. As the container 3 is inclined with the dump pin 23 being engaged into the side hole 24 of the container 3, the dump pin 23 is evacuated. In this condition, the limit switches LS9 and LS10 are on and the normally open contacts S9 and S10 of the arm forward and rearward rotation controlling means 56 are connected. To maintain the posture of the container 3, the insertion pin is engaged into the hole 22 of the bracket 13. The limit switch LS5 is on to connect the normally open contact S5 of the pressure controlling means 57 so that the electromagnetic valve 37 assumes the functional position 37a through the excitation of the solenoid SOL5. As a result, the discharge pressure of the operation oil to be discharged from the hydraulic pump 62 is regulated by the relief valve 36 of the low pressure set to operate the auxiliary cylinder 15 by the extremely low operation oil pressure. When the push button PB1 is depressed in this condition, the relay R5 is energized to extend the lift cylinder 14 to cause the lift arm 5 to rearwardly rotate. The limit switch LS4 is off by the forward rotation of the auxiliary arm 6, and the relay R6 is also energized by the connection of the normally closed contact s4 so that the operation oil is fed to the auxiliary cylinder 15 to be inverted by the operation of the lift cylinder 14 to prevent the excessive oil pressure from being applied upon the auxiliary cylinder 15. It is to be noted that the procedure for the container 3 to be unloaded on the ground after the out-rigger 18 has been extended is almost similar to the operation described in the (1). The operation of drawing out the insertion pin 12 which connects the container 3 unloaded on the ground and the auxiliary arm 6 is performed by depression of the push button PB6 of the engagement and disengagement controlling means 59, excitation of the solenoid SOL7 through the normally open contact T12 to be connected through the energization of the relay R12, and contracting the cylinder 19. Finally, forwardly rotate the lift arm 5 and the auxiliary arm 6 and push the push button PB4 of the extension and contraction controlling means 58, and the relay R10 is energized to excite the solenoid SOL11 with the connection of the normally open contact T10. The hydraulic jack 41 is contracted to retract the out-rigger 18 so as to move the body 4.

(Second Embodiment)

Figure 9:
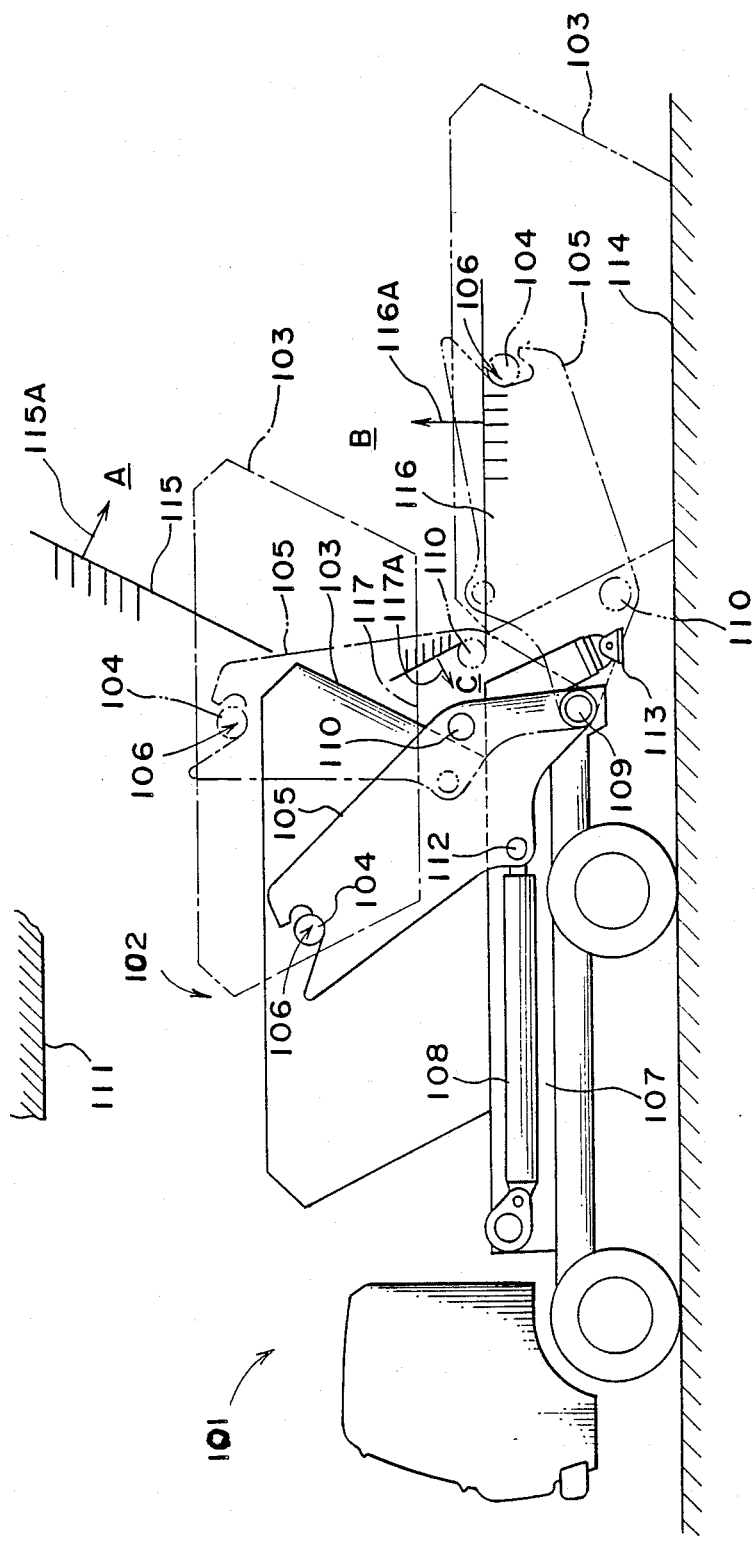
FIG. 9 is a view for illustrating the construction and operation of the cargo-work vehicle of the present invention.
Figure 10:
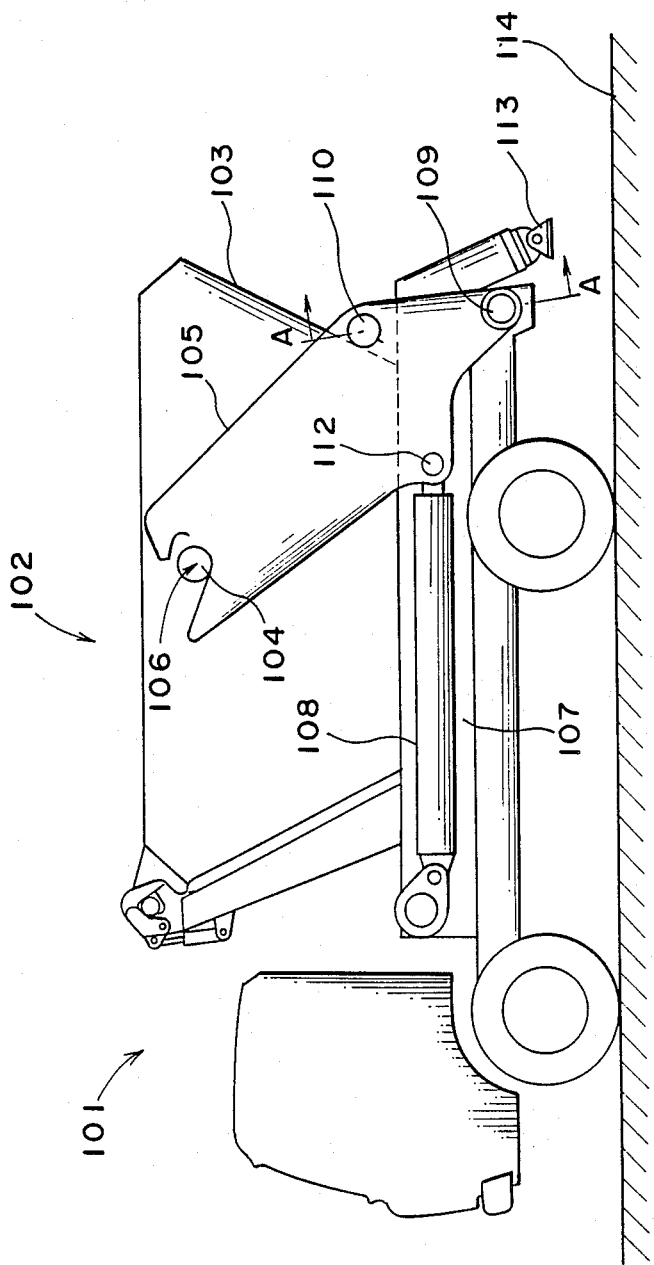
FIG. 10 shows one example of a cargo-work vehicle to which the present invention is applied.

Referring now to the drawings, there is shown in FIGS. 9 through 12 a second embodiment according to the present invention. FIG. 10 is one example of the cargo-work vehicle 101, whereby the container 103 which is capable of being engaged with or disengaged from the cargo-work apparatus is adapted to be unloaded on the body 107. A pair of right and left lift arms 105 for supporting the container 103 to load or unload it are mounted on the body 107. The lift arm 105 is mounted through the hydraulic cylinder 108 and the support rod 109 and is supported to be forwardly and rearwardly rotated around the support rod 109 by the expanding and contracting operations of the hydraulic cylinders 108. Although the pair of lift arms 105 are mounted on one long support rod 109 as shown in the drawings, the pair of lift arms 105 can be supported respectively by a pair of individual short support rods independent on the right and left of the body 107, while the lift are 106 of the body 107 is pivotally supported. The tip ends of the respective piston rods are mounted on both the right and left lift arms 105 through the pin shaft 112. When the piston rods are extended, the lift arm 105 rotates rearwardly as far as the position of the two-dot chain line as shown in FIG. 9. The out-rigger 113 (see FIG. 10) with the hydraulic jack (not shown) being built-in is disposed on the right and left of the rear portion of the body 107, the body 107 is prevented from assuming the head raising posture because of the height in the unloading operation of the container 103 through the cargo-work apparatus 102.

The lift arm 105 is branched on the tip-end side of the main body, the root is engaged with the support shaft 104 extended to the right and left of the container 103 to form the support 106 for supporting the container 103. The support shaft 104 is mounted in a position above the gravity of the container 103, and is placed on the support 106 during the cargo-work operation. When the lift arm 105 is forwardly and rearwardly rotated, the support shaft comes into sliding contact condition where it slides pivotally by the support 106 so as to load and unload the container 103 onto the body 107.

The coupling rod 110 close to the tip end on the conventional upper side with the lift arm 105 being forked is arranged in position near the support rod 109 as described later, and the tip end may be made shorter. The tip end shape may be formed so as not to be extended above the container 103. Also, the right and left lift arms 105, 105 are connected for integration. The coupling rod 110 for improvement of the rigidity is mounted parallel (see FIG. 11) to the support rod 109 and in proximity to the support rod 109 shown in FIG. 10. Namely, when the container 103 is placed on the body 107, instead of the conventional position, the mounting position of the coupling rod 110 shown in the solid line in FIG. 9 is rearward from the container and is provided above the body 107. When the container 103 is unloaded outside the vehicle, it is forward from the container 103 and is provided rearwardly of the body 107 of the vehicle. Also, during the forward and rearward operation of the container 103, the position of the coupling rod 110 is considered to be placed above the body 107 or rearwardly of the body so as not to be interfered with by container 103.

In the container 103 loaded on the body 107, the position of the coupling rod 110 shown in the solid line is selected as follows. It is selected, so that the position is located within the common space of the space A in the arrow mark 115A direction of the rear face line 115 of the container 103 and of the space B in the arrow mark 16A direction of the upper line 116 of the vehicle body 107. However, the accommodation may be made if it is not located above the vehicle body 107 although it depends upon the shape of the vehicle body. It will do if it is located in a position outside of the vehicle body in the rearward space of the container 103. On the other hand, in the unloaded container 103, the position of the coupling rod 110 shown in the two-dot chain line is selected, decided in a position of the space C in the arrow mark 117A direction of the front face line 117 of the container 103. As a result, when the lift arm 105 is forwardly and rearwardly rotated by the extension and contraction of the hydraulic cylinder 108, the coupling rod 110 moves without any interference with the vehicle body 107, the container 103, the ceiling 111 of the container yard, the ground 114, so that the cargo-work apparatus 102 may be smoothly operated.

Figure 11:
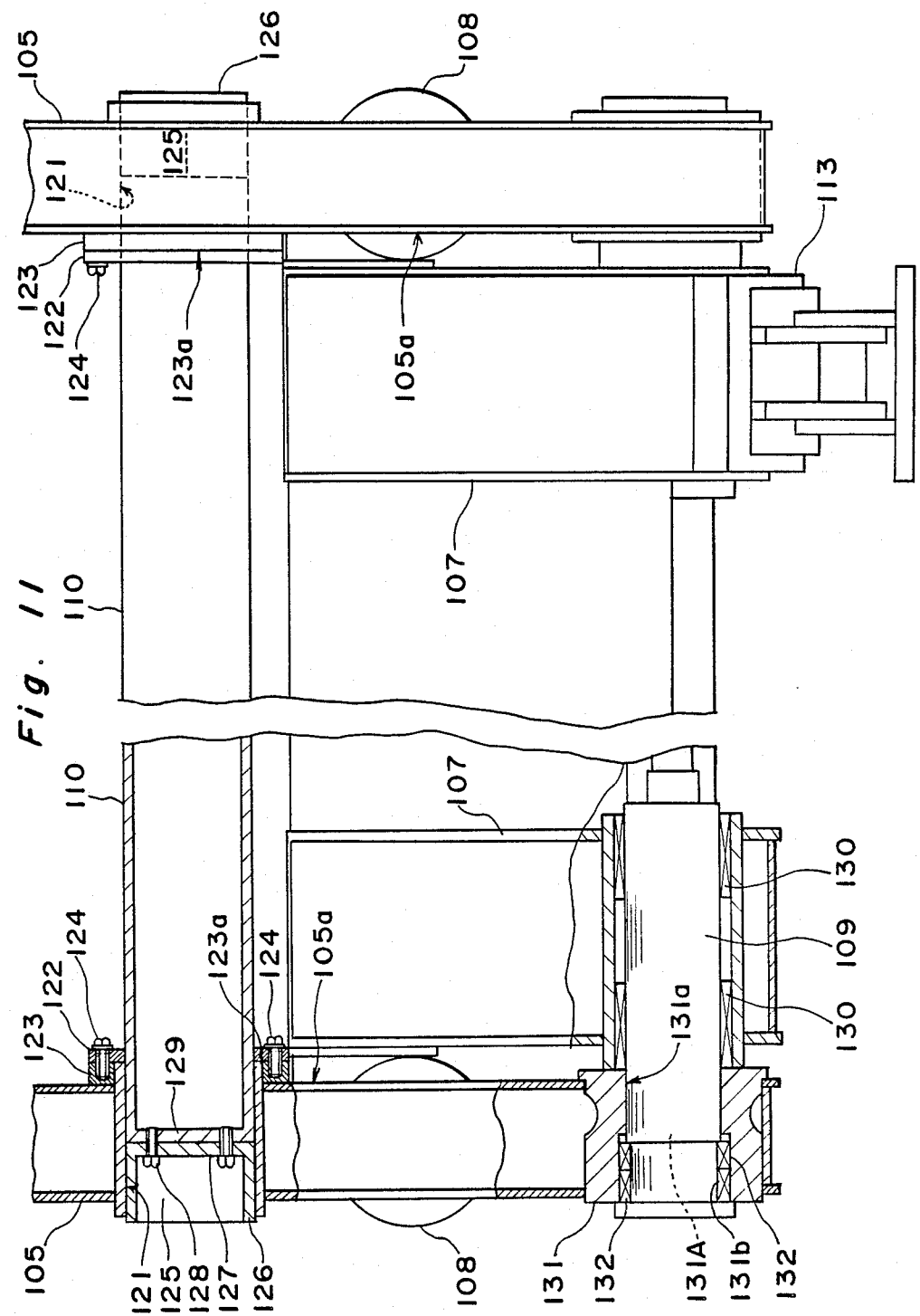
FIG. 11 shows cross-sectional views each showing a coupling rod and a support rod taken along a line A—A in FIG. 10.

As shown in FIG. 11, the coupling rod 110 is composed of an empty pipe for lighter weight and improved rigidity. Also, for easier engagement of the coupling rod 110 with the lift arm 105, the engagement amount in the tip end portion of the coupling rod 110 into the engagement hole 121 provided in the lift arm 105 is selected to be about one half of the width of the lift arm 105. It is to be noted that two flanges 122 are provided in the positions towards the center from the tip end portions of the coupling rod 110. On the other hand, a mounting member 123 is secured on the inner face 105a of the lift arm 105, the flange 122 is clamped by the bolt 124 on the surfaces 123a to secure the coupling rod 110 to the lift arm 105A. After the coupling rod 110 has been secured, the space 125 of about one half of the width of the lift arm 105 is caused in the engagement hole 121 of the lift arm 105. When the cargo-work vehicle 101 runs, the accommodated load within the container 103 may be offset, so that the twist force works which separates a pair of right and left lift arms 5 in the opposite direction. The twist force is applied upon the tip end portion of the engaged coupling rod 110 engaged with the lift arm 105. As a large force is applied through "twist" caused by it, the tip end portion of the coupling rod 110 may be damaged. In order to avoid the damage, the space 125 is filled by the insertion member 126, while the insertion member 126 and the coupling rod 110 are integrated to keep the tip end portion of the coupling rod 110. As a result, the force applied upon the tip end of the coupling rod 110 by the "twist" will be small in proportion to the distance. Also, the insertion member 126 is composed of an empty pipe. The end plate 127 is mounted. It is clamped with the end plate 129 of the coupling rod 110 by the bolt 128 so that the insertion member 126 is fixed to the coupling rod 110 for integration.

Also, the support rod 109 is supported by the bearing 130 provided downwardly of the body 107. The tip end is inserted into the engagement hole 131A in the retaining member 131 integrated with the lift arm 105. In the present embodiment, when the lift arm 105 pivots around the support rod 109 by the hydraulic cylinder 108, the support rod 109 is adapted to pivot together with the lift arm 105 integrated through the retaining member 131. Also, the support rod 109 connects both the lift arms 105 to cause the pivotal operation of both the lift arms 105 to follow suit. As the following function may be performed through the positive integration of the lift arm 105 and the support rod 109, integration by welding therebetween is considered. However, after the welding operation, the cutting operation is inconveniently necessary to be performed, for example, in the replacement of the support rod 109. When the integrating operation is performed by the use of a key, instead of welding, a notching operation of the key way disposed in the support rod 109 and the retaining member 131 is required, thus requiring machine-work 10 of extremely high precision. As vibrations are caused in accordance with the errors among the pitches if the integration through the interlocking of the splines is considered, it is not suitable for the tuning. For the provision of the lift arm 5 which may be tuned, a bonding member 132 is adopted in the integration of the retaining member 131 and the support rod 109.

Figure 12:
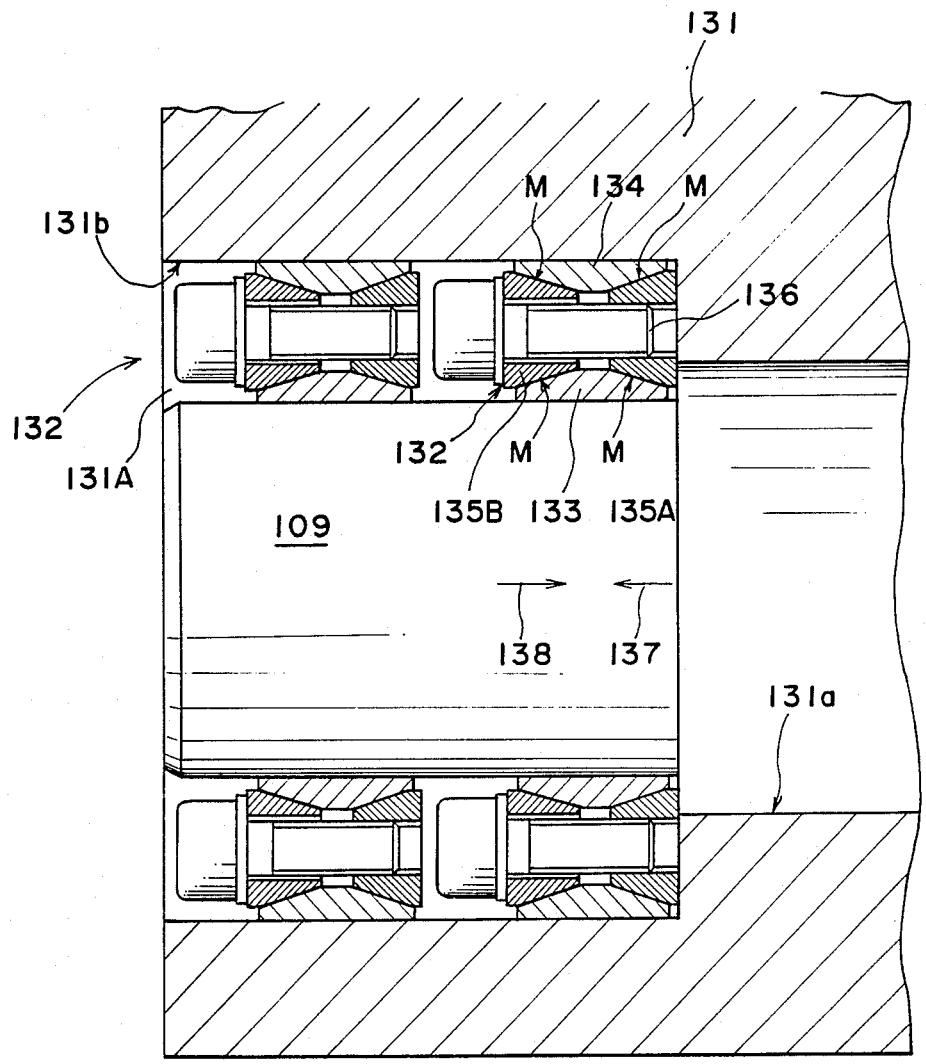
FIG. 12 is an enlarged view with the combining member being mounted.

The bonding member 132 is composed of a ring-shaped inner peripheral member 133 shown in FIG. 12, a ring-shaped outer peripheral member 134, ring members 135A, 135B which have a conical tapered face M come into contact against the inner peripheral member 133 and the outer peripheral member 134 with the taper face M and are slidable, and a bolt 136. The ring member 135A has a plurality of threads that the bolt 136 is engaged with, while the ring member 135B has the through-hole of the bolt 136 formed. Accordingly, the ring member 135A moves in the arrow 137 direction through the screwing of the bolt 136, so that the ring member 135B is adapted to move in the arrow 138 direction. Also, one slit is cut in the bolt 136 direction in the inner peripheral member 133 and the outer peripheral member 134 so as to allow the peripheral extending and contracting operation. As a result, the inner peripheral member 133 is contracted inwardly through the tapered face M, the outer peripheral member 134 may be externally extended. As the adjacent insertion hole 131b is assumed to become a hole large in diameter although the hole 131a in the engagement hole 131A formed in the retaining member 131 shown in FIG. 11 retains the support rod 109, the bonding member 132 may be inserted into the insertion hole 131b. And, for example, two bonding members 132 are inserted into the insertion hole 132b for the integration of the support rod 109 and the retaining member 131. When the bolt 136 shown in FIG. 12 is clamped, the strong bonding between the support rod 109 and the retaining member 131 is made. Both the lift arms 5 pivot with the support rod 109, turning, so that the container 103 may smoothly rotate forwardly and rearwardly.

The cargo-work apparatus 102 in the cargo-work vehicle 101 of the above construction is capable of loading and unloading, carrying the container 103 in the following manner.

In the cargo-work apparatus 102 shown in FIG. 10, the support shaft 104 of the container 103 is retained by the support portion 106 of the lift arm 105 and the container 103 is loaded on the body 107. The cargo-work vehicle 101 in this condition carries the container 103 with the accommodated contained therein towards the destination. When the container 103 is unloaded at the destination, the out-rigger 113 is extended to prevent the front of the vehicle body 107 from being raised. In this case, the coupling rod 110 which connects both the lift arms 105 is located rearwardly of the container 103 and upwardly of the body 107, while the support rod 109 is firmly integrated with both the lift arms 105 through the above-described bonding member 132. When the hydraulic cylinder 108 is extended, the lift arm 105, the container 103, the coupling rod 110 pivot around the support rod 109 as shown in FIG. 9. The tip end of the shortened lift arm 105, even if it is located in a position shown in one-dot chain line, does not interfere with the ceiling 111 of the container yard (See FIG. 9). When the container 103 is unloaded on the ground 114 as shown in two-dot chain line, the coupling rod 110 is located before the container 103. In, order to load the container 103 in the container yard onto body 107, the operation will contract the hydraulic cylinder 108 after the support shaft 104 has been engaged with the support 106 of the lift arm 105 as shown in the two-dot chain line. The container 103 may be smoothly loaded without any collision against the ceiling 111.

(Third Embodiment)

Referring now to the drawings, there is shown in FIGS. 13 through 20 a third embodiment according to the present invention. FIG. 13 shows one example of the cargo-work vehicle 201, wherein the container 203 which may be freely engaged with or disengaged from the cargo-work apparatus 202 is adapted to be loaded or unloaded on the body 207. A pair of right and left lift arms 205 (see FIG. 15) which supports the container 203 to load or unload it are mounted on the body 207 for supporting the container during forward and rearward rotation around the support shaft 209 secured to the body 207.

The side of the tip end of the main body of the lift arm 205 is branched into a fork shape, the root is engaged with the support shaft 204 extending to the right and left of the container 203 to form the support 206 for supporting the container 203. The support shaft 214 is supported in a position above the center of gravity of the container 203 and is placed on the support 206 during the cargo-work operation. When the lift arm 205 is rotated forwardly or rearwardly, the support shaft 204 becomes slidable so that the container 203 is loaded on or unloaded from the body 207. The upper-side tip end which is forked is extended as far as the position where it does not interfere with the container 203, the right and left lift arms 205, 205 are integrated so that the coupling shaft 216 is mounted for improvement of the rigidity.

The lift arm 205 is adapted to be rotated forwardly or rearwardly by the expanding and contracting operations of the hydraulic cylinder 208 engaged oscillably on the body 207. The tip ends of the respective piston rods are mounted on both the right and left lift arms 205 through the pin 217. When the piston rod is extended, the lift arm 205 is rotated as far as the position of the imaginary line. The out-rigger 218 with the hydraulic jack shown being incorporated is provided to the right and left in the rear of the body 207. The body 207 is prevented from assuming the head-up posture because of the weight provided when the container 203 is loaded and unloaded by the cargo-work apparatus 202.

Figure 14:
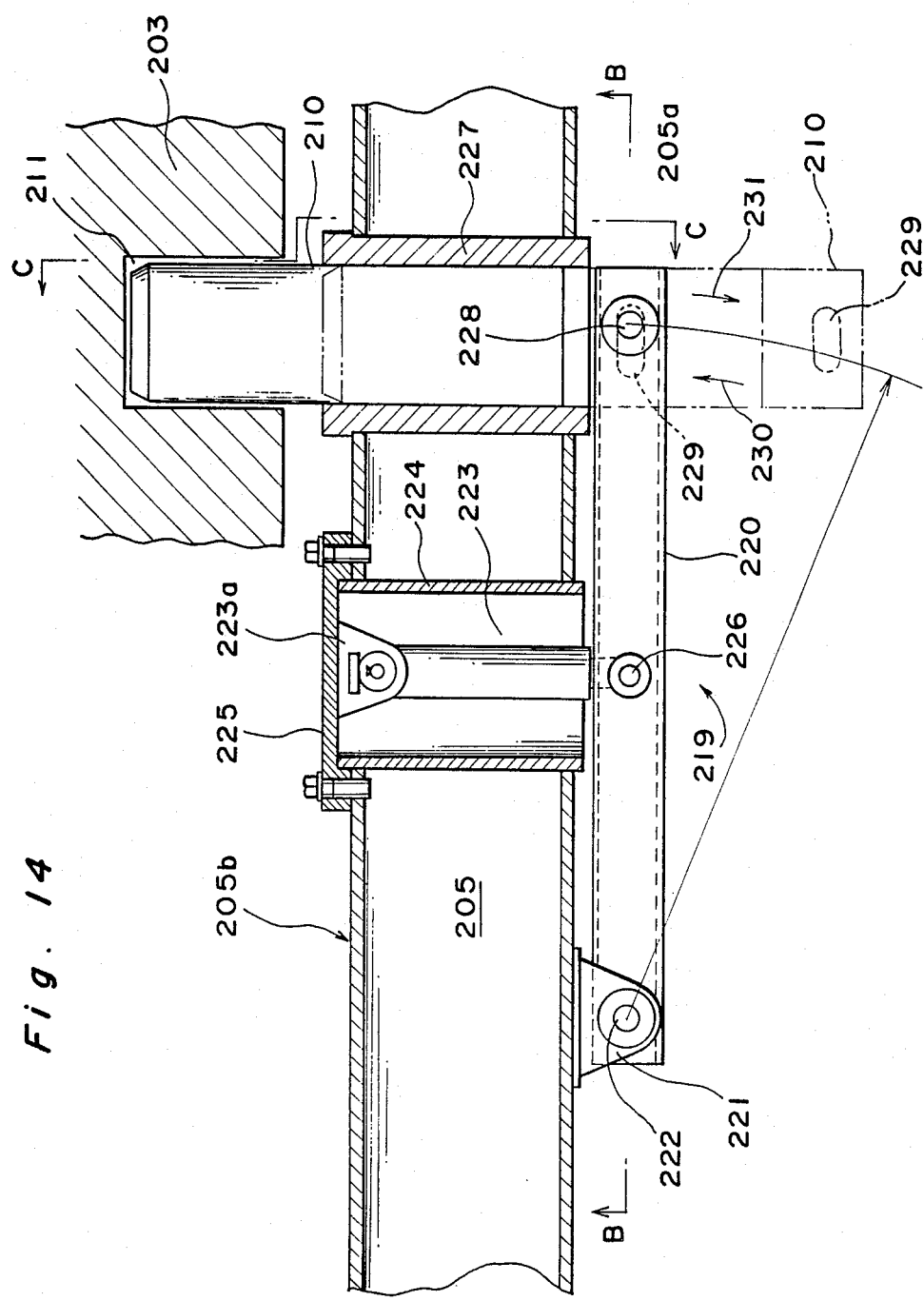
FIG. 14 is an engagement, disengagement mechanism view in the cargo-work vehicle of the present invention.
Figure 16:
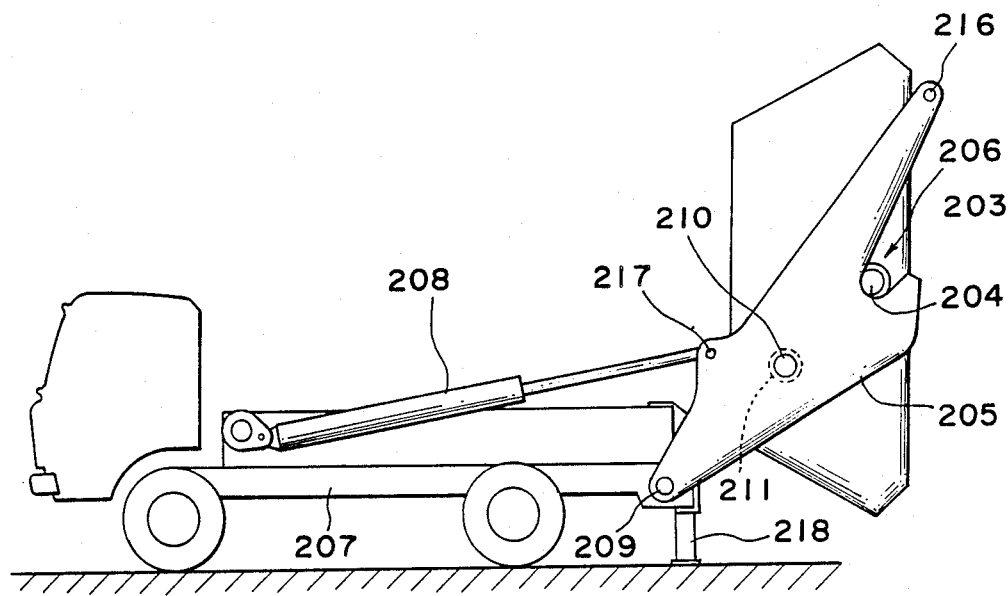
FIG. 16 is a view for illustrating the operation in a case where the container has been dumped.

Such a cargo-work apparatus as described hereinabove, is adapted to straightly erect the container 203 loaded on the car 207 to unload only the accommodated load rearwardly of the vehicle as shown in FIG. 16. As a result, a dump pin 210 which is advanced when the container 203 is inclined from the horizontal posture to the vertical posture or is inclined reversely is provided on the right and left lift arms 205. An engagement and disengagement mechanism 219, instead of a slipping off and on mechanism described in the conventional art for the advance or retreat of the dump pin 210, is engaged with the external side face 205a of the lift arm 205 as shown in FIG. 14. The engagement and disengagement mechanism 219 is composed of a link 220 for engagement and disengagement use, a bracket 21 for supporting one end of the link 220 in the outer side face 205a and a support shaft 222 which becomes a pivotal support, a cylinder 223 for engagement and disengagement use coupled to the intermediate position of the link 220, a dump pin 210 mounted in the position of the other end of the link 220 for engagement and disengagement use.

Figure 17:
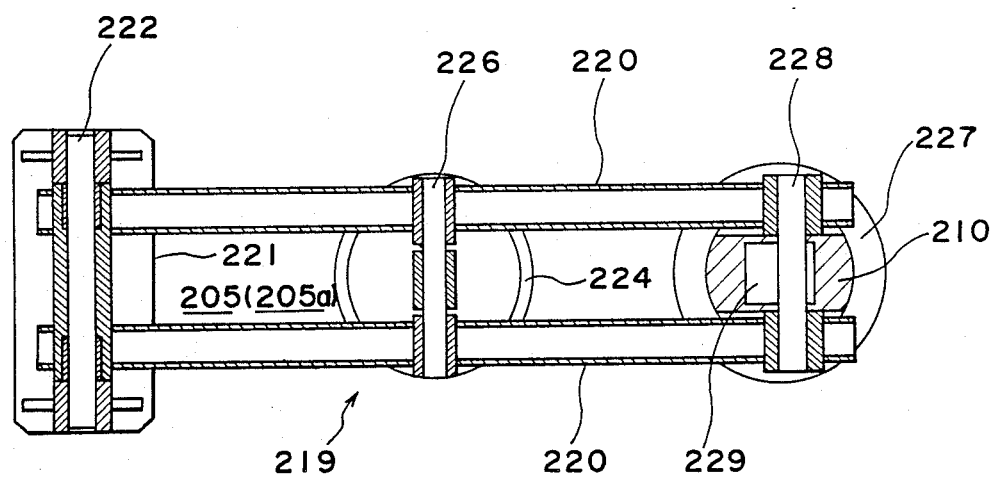
FIG. 17 is an arrow view taken along a line B—B in FIG. 14.
Figure 18:
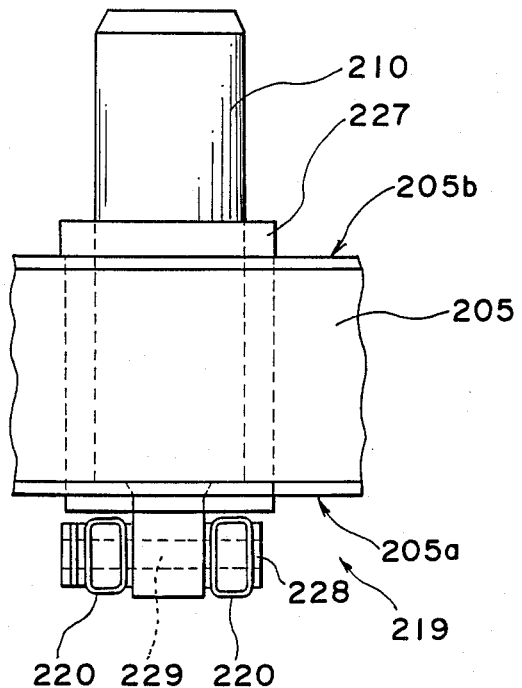
FIG. 18 is an arrow view taken along a line C—C in FIG. 2.

The lift arm 205 has two steel plates erected into a box shape to provide rigidity, to form the accommodation hole for the cylinder 223, and a through-hole for the dump pin 210. A cylindrical body 224 is inserted into the accommodation hole. A backing-strip member 225 is mounted on the inner side face 205b of the lift arm 205 to form the accommodation space of the cylinder 223. A cylinder 223 which causes the link 220 to leave or contact the lift arm 205 in accordance with the expansion and contraction is engaged through the mounting member 223a with the backingstrip member 225. And the tip end of the cylinder 223 is coupled through the pin shaft 226 to the middle position of the link 220 through the pin shaft 226 so that the engagement and disengagement mechanism 219 is directed as a whole externally of the lift arm 205 for compactor operation. Also, a guide cylinder body 227 is inserted into the through-hole to guide the dump pin 210 which advances and retreats towards the container side wall hole 211 provided the container 203 located on the inner side of the lift arm 205. Furthermore, the dump pin 210 is mounted through the pin shaft 228 on the link 220, the insertion hole 229 of the pin shaft 228 is formed long in the longitudinally of the link 220. Thus, if the link 220 is circularly moved in the arrow 230 and 231 direction through the expansion and contraction of the cylinder 223 around the support shaft 222, the advance and retreat of the dump pin 210 is not interfered with. As shown in FIGS. 17 and 18, the link 220 is formed of a pair of two members, is pivotally mounted around the pin shaft 222 respectively on the right and left lift arms 205. Also, when the cargo-work vehicle 201 runs with the container 203 being loaded thereon or only the accommodated is unloaded in the vertical posture rearwardly of the vehicle body, the dump pin 210 advances pivoting in the arrow 230 direction through the contraction of the hydraulic cylinder 223 as shown in FIG. 14 so that the outward projection of the lift arm 205 of the engagement and disengagement mechanism 219 after the advance may be minimal. Even when the placement position in the lift arm 205 of the dump pin 210 and the cylinder 223 is set reversely, the projection of the engagement and disengagement mechanism 219 may be minimal. The projection of the engagement and disengagement mechanism 219 during the contraction is necessarily made smaller through the agreement between the moving direction of the piston rod during the contraction of the cylinder 223 and the moving direction of the dump pin 210.

The loading and unloading operations of the container in the cargo-work vehicle constructed hereinabove and the unloading operation of the accommodated load of the container will be described hereinafter.

Figure 19C:
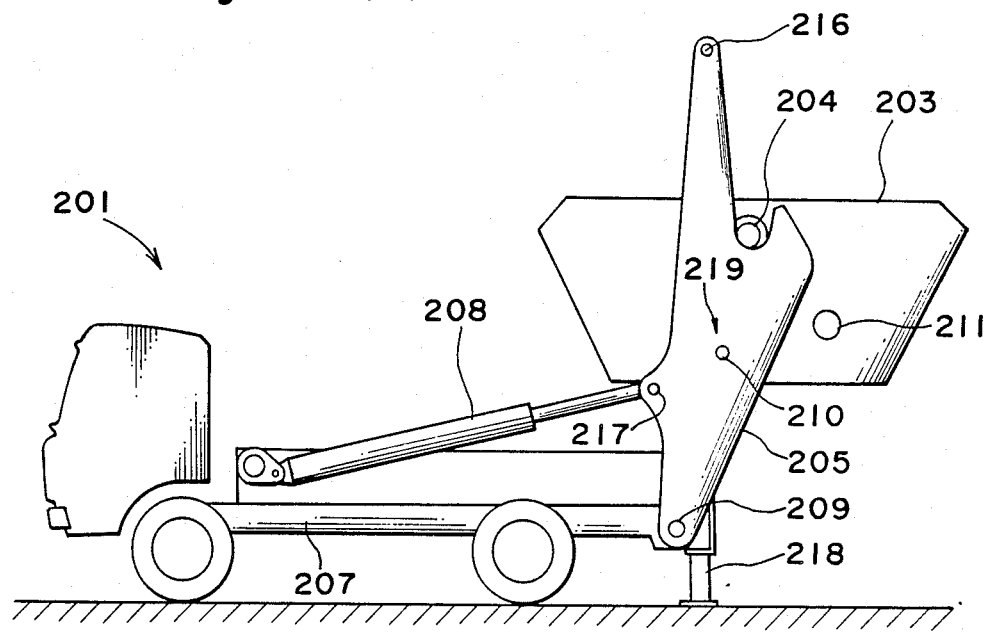
FIG. 19(c) is an operation condition view wherein the container is unloaded, being retained horizontally.

(1) As shown in FIG. 19(a), the container is apart from body 207. The container 203 located on the ground in the container yard is loaded by a series of operations of FIGS. 19(b) through 19(d).

The lift arm 205 shown in FIG. 19(a) is forwardly rotated on the vehicle body 207 with the hydraulic cylinder 208 being contracted. When the dump pin 210 is advanced inwardly of the lift arm 205, it becomes an interference in the support of the container 203 on the ground, so that the dump pin 210 is evacuated. Namely, in the engagement and disengagement mechanism 219 as shown in FIG. 14, the cylinder 223 is extended to cause the link 220 to pivot in the arrow 231 direction so that the dump pin 210 is outwardly evacuated. And the hydraulic cylinder 208 is extended to rearwardly rotate the lift arm 205 around the support shaft 209. The support 206 of the lift arm 205 is brought closer, in the rearward rotating position, to the support shaft 204 of the container 203 with the accommodated therein on the ground.

In this condition, the vehicle body 207 is rearwardly moved as shown in FIG. 19(b), and the support shaft 204 is engaged with the support 206 of the lift arm 205. In order to prevent the body 207 from raising the cab in a case where the container 203 is supported, the operator extends the hydraulic jack incorporated in the outrigger 218 as shown in FIG. 19(c) to provide support on the ground with the 5 right and left out-riggers 218. When the container 203 is ready to be loaded on the vehicle body 204 in this manner, the container 203 is loaded on the vehicle body 207 without being dumped through the contraction of the hydraulic cylinder 208. When the lift arm 205 is forwardly rotated completely as shown in FIG. 19(d), the contracting operation of the hydraulic cylinder 208 stops.

Figure 19D:
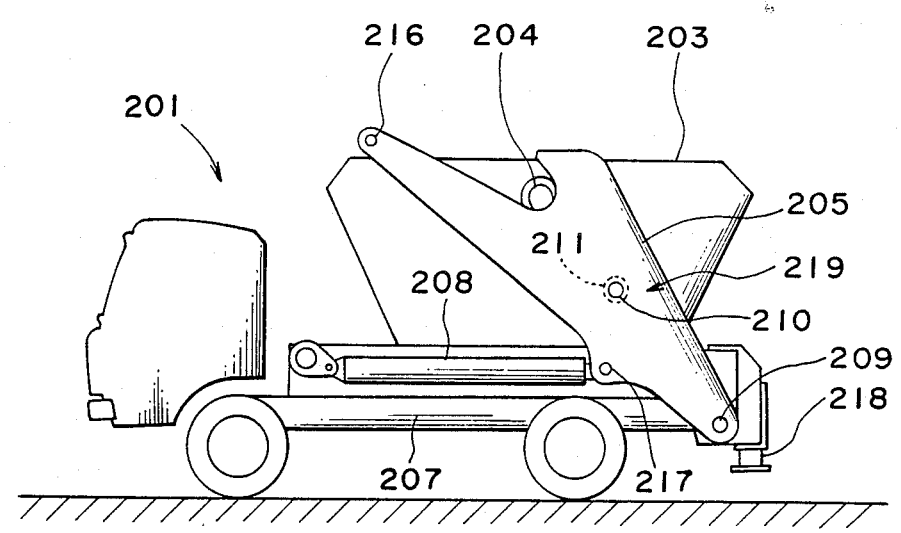
FIG. 19(d) is a view for illustrating the operation showing a condition where the container is loaded on the body 4.

(2) A case will be described hereinafter wherein a container 203 is loaded on the body 207 as shown in FIG. 19(d), and runs for the destination from the container yard or the like.

The lift arm 205 forwardly rotates on the body 207 with the hydraulic cylinder 208 being contracted. In the engagement and disengagement mechanism 219 shown in FIG. 2, in this condition, the cylinder 223 is contracted to rotate the link 220 in the direction of the arrow 230. The dumping pin 210 is advanced towards the container side wall hole 211 and is engaged into it so that the lift arm 205 and the container 203 are integrated in the position of the dump pin 210. Namely, the container 203 is supported by the support portion 206 on the body 207 with the dump pin 210 being strained. After the out-rigger 218 has been raised, the cargo-work vehicle 210 runs. The container 203 is secured to the body 207 by the restriction through the lift arm 205 and is carried to the destination without oscillation.

(3) A case will be described where only the accommodated date load is unloaded with the container 203 on the body 204 being vertical in posture as shown in FIG. 16.

When the cargo-work vehicle 201 shown in FIG. 13 arrives at the destination, the out-rigger 218 is extended. Furthermore, the dump pin 210 in the engagement and disengagement mechanism 219 is engaged into the container side wall hole 211 around the container 203 with the accommodated therein. When the hydraulic cylinder 208 is continuously extended, the container 203 is integrated with the lift arm 205 for restriction. Thus, the lift arm 205 rearwardly rotates, supporting the container 203 through the support shaft 204 by the support 206. During the rearward rotation, as shown in FIG. 16, the container 203 is continuously inclined through the extension of the hydraulic cylinder 208 till the vertical posture in the position of the rear portion of the body vehicle. As a result, the container 203 is erected straight so that the accommodated is unloaded. Furthermore, the hydraulic cylinder 208 as it is contracted so that the empty container 203 is loaded on the body 207 again.

(4) Finally, a case will be described wherein the container 203 is loaded on the body 207 as shown in FIG. 19(d), and the container 203 is unloaded on the ground as shown in FIGS. 19(b) and 19(c).

The lift arm 205 shown in FIG. 19(d) is located in the forwardly rotated position. When the cylinder 223 is extended in the engagement and disengagement as shown in FIG. 14 in this condition, the dumping pin 210 is drawn out from the container side wall hole 211. The container 203 and the lift arm 205 are separated so that the container 203 is restrained through the dump pin 210. When the out-rigger 218 is extended and the hydraulic cylinder 208 is extended, the lift arm 205 is rearwardly rotated as shown in FIG. 19(c) and moves rearwardly of the vehicle body while retaining the container 203 in the horizontal posture. Furthermore, when the rearward rotating operation continues, the container 203 is landed behind the body in the horizontal posture and unloaded in the given position of the container yard.

In this manner, the loading and unloading operation of the container 203 in the cargo-work vehicle 201 and the unloading operation of the accommodated of the container are performed. As described hereinabove, during the running operation of the cargo-work vehicle 201 or during the unloading operation of the accommodated within the container 203, it is performed with the dump pin 210 being engaged into the container side wall hole 211. Thus, the restrain may be performed on thing almost equivalent to the width of the link 220 externally of the car 207 from the external side face 205a of the lift arm 205 shown in FIG. 14.

Figure 20:
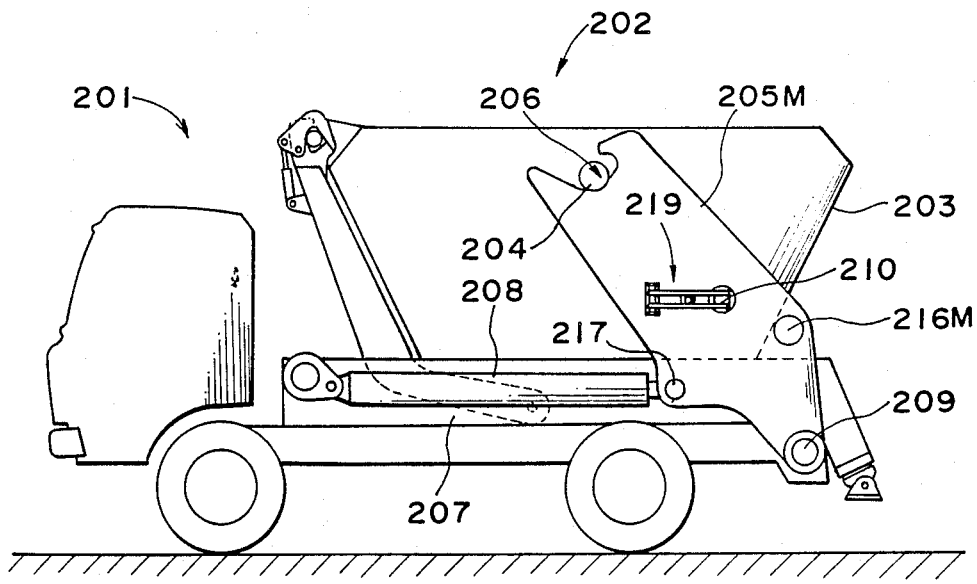
FIG. 20 is a whole view applied to the cargo-work apparatus having the lift arm of different shape.

As shown in FIG. 20, the above-described engagement and disengagement mechanism 219 may be mounted on such a lift arm 205M as the coupling shaft 216M is located in the rearward position of the container 203 loaded on the body 207 and is lower than the top face of the container 203. This example has an advantage in that the lift arm 205M which may be forwardly and rearwardly rotated around the support shaft 209 becomes shorter, so that the large space is not required when the container 203 is unloaded. When a special dump pin, a container side wall hole are similarly provided even in the cargo-work apparatus of a type where the chain installed on the front and rear of the container is supported, instead of the cargo-work apparatus for supporting the container 203 through the support shaft 204 by the support 206 in the forked lift arm shown in FIG. 13 and FIG. 20, the idea of the present invention may be applied to the lift arm supporting the container.

(Fourth Embodiment)

Figure 21:
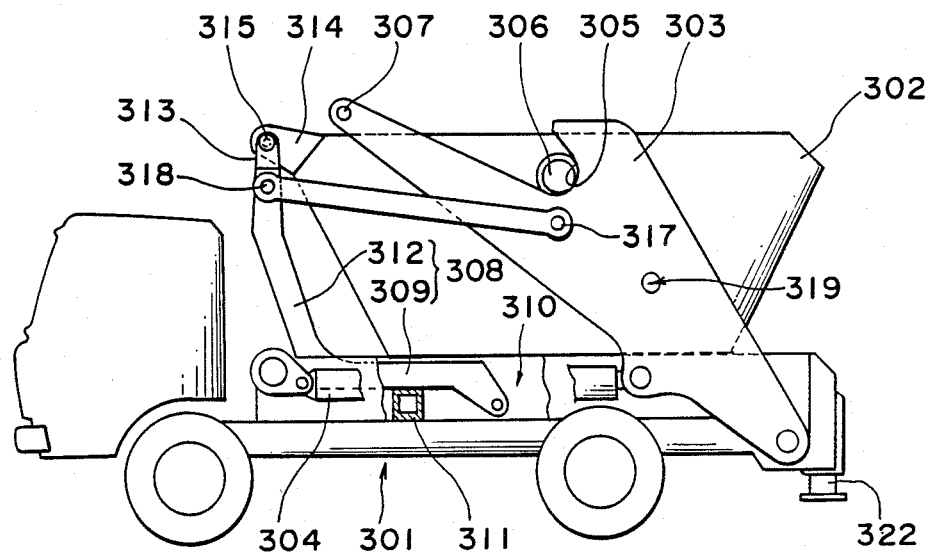
FIG. 21 is a whole view.
Figure 22:
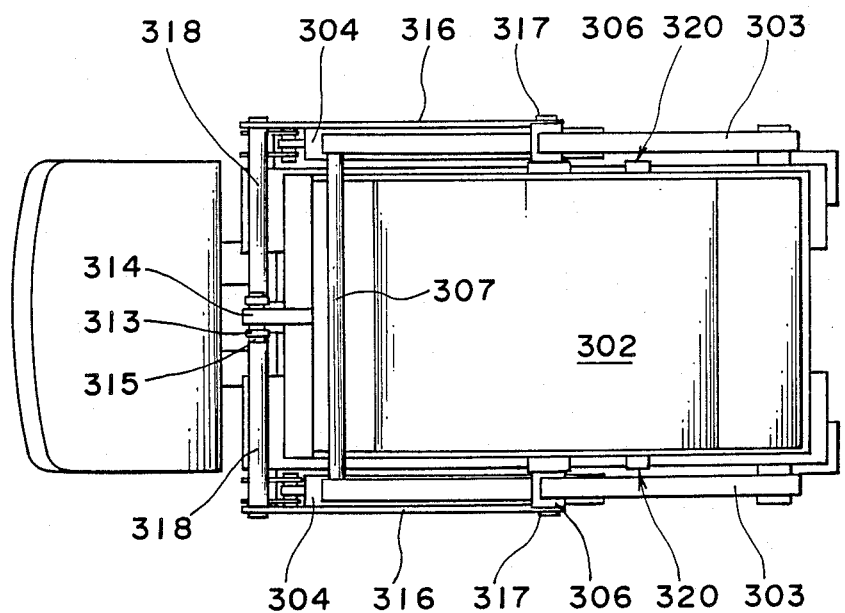
FIG. 22 is a top face view of FIG. 21.

Referring now to the drawings, there is shown in FIGS. 21 through 23 a fourth embodiment according to the present invention. Support arms 303 for supporting the container 302 are rotatably provided forwardly and rearwardly on both sides of the rear portion of the vehicle body 301. The support arms 303 are adapted to be pivoted by the hydraulic cylinders 304 extended in the front and rear direction sideways of the body 301. The notch shaped supports 305 are formed at the free ends of the support arms 303 to support the engagement shafts 306 projected sideward of the container 302 by the supports 305.

Also, a coupling shaft 307 which makes the right and left support arms 303 rigid, and does not obstruct container 302, is provided on the portions partially extended from the free ends of the support arms 303.

The L-shaped auxiliary arm 308 is supported at its one end through the shaft for the forward and rearward pivot at the center of the front portion of the body 301.

In this case, the horizontal portion 309 of the auxiliary arm 308 is engaged into the hollow portion 310 formed in the center of the body 301 and is supported by the cross beam 311 of the body 301 so that the vertical portion 312 is adapted to be normally positioned forwardly from the container 302. Thus, even when the container 302 is placed on the body 301, the auxiliary arm 308 is adapted to hit against the container 302.

Also, the container connection 313 is formed at the free end of the auxiliary arm 308. The connection portion 313 is adapted to be combined through the pin 315 with the bracket 314 provided on the upper front portion of the container 302.

Coupling rods 316 couple both arms 303. The coupling rods 316 are supported pivotally at the respective ends on the shafts 317 projected sideways of the support arms 303 and are supported pivotally at the respective other ends on the shafts 318 projected sideways from the auxiliary arm 308.

Each of the members form a parallelogram with the pivotal center of both the arms 303, the support portion 305 and the connecting portion 313, and a parallelogram is formed with the pivotal center of both arms 303, 308, the shafts 317, 318 coupled to both the ends of the coupling rod 316, so that the container 302 may be loaded and unloaded normally in the horizontal condition when the support arms 303 have been pivoted with the container 302 being supported and engaged with.

Holes 319 are provided in the support arms 303. Pins 321 are inserted into the holes 319 and holes 320 provided in both the side faces of the container 302 so that the container 302 is adapted to be integrated with the support arms 302.

An out-rigger is provided on the rear portion of the vehicle body 301. In this fourth embodiment, the hydraulic cylinder is mounted on the side of the support arm so that the auxiliary arm is adapted to be pivoted by the pivotal operation of the support arm. The similar operation effect is provided if the support arm is adapted to be pivoted by the pivotal operation of the auxiliary arm through the mounting of the hydraulic cylinder on the side of the auxiliary arm.

The operation will be described hereinafter. In order to load the container, the hydraulic cylinders 304 are extended from the condition of FIG. 23(a) in a position where the vehicle has been brought closer to the container so as to rearwardly pivot support arms 303 and to pivot the auxiliary arm 308.

Figure 23A:
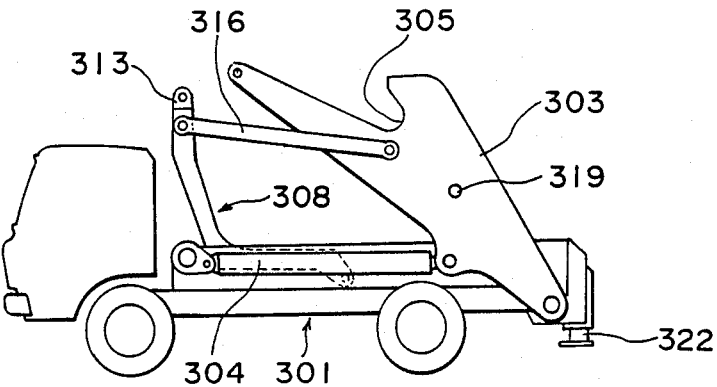
FIGS. 23(a) through 23(e) are operating condition views.
Figure 23B:
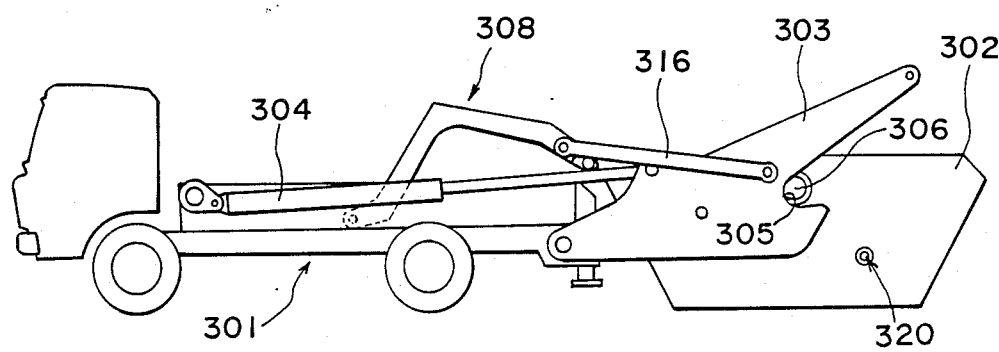

In order to make the vehicle back up in this condition, the engagement shafts 306 are engaged with the support portions 305 as shown in FIG. 23(b) and the connection portion 313 is combined with the bracket 314 on the side of the container 302 with the pin 315.

Figure 23C:
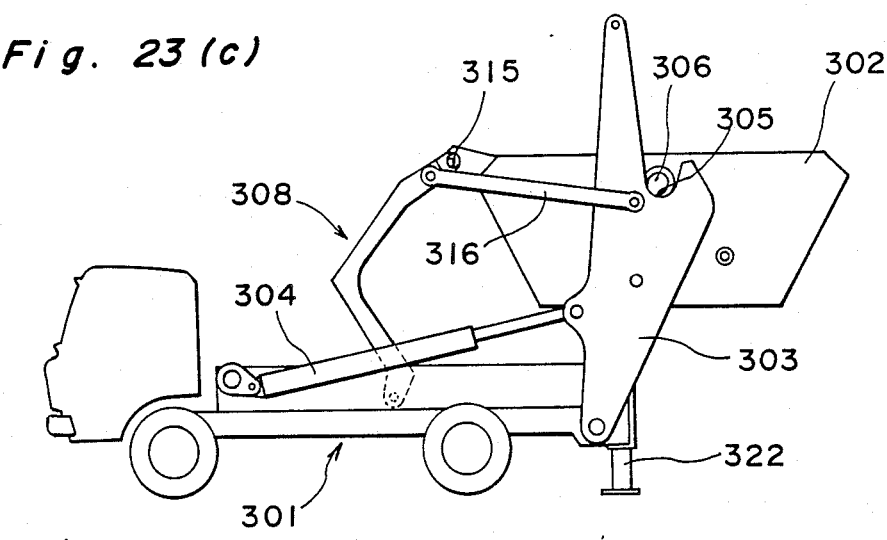

After both the arms 303, 308 have been engaged with the container 302, the out-rigger 322 is extended as shown in FIG. 23(c) and the hydraulic cylinders 304 are contracted to forwardly pivot both the arms 303, 308.

In this case, the support portions 305, the connection portion 313, the shafts 307, 308 coupled to both the ends of the coupling rods 316 respectively form the parallelogram with the pivotal centers of both the arms 303, 308 so that the container 302 moves, being normally retained horizontally.

Figure 23D:
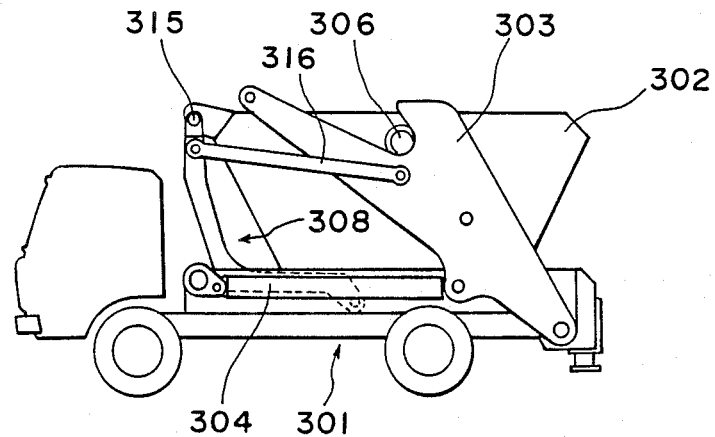
Figure 23E:
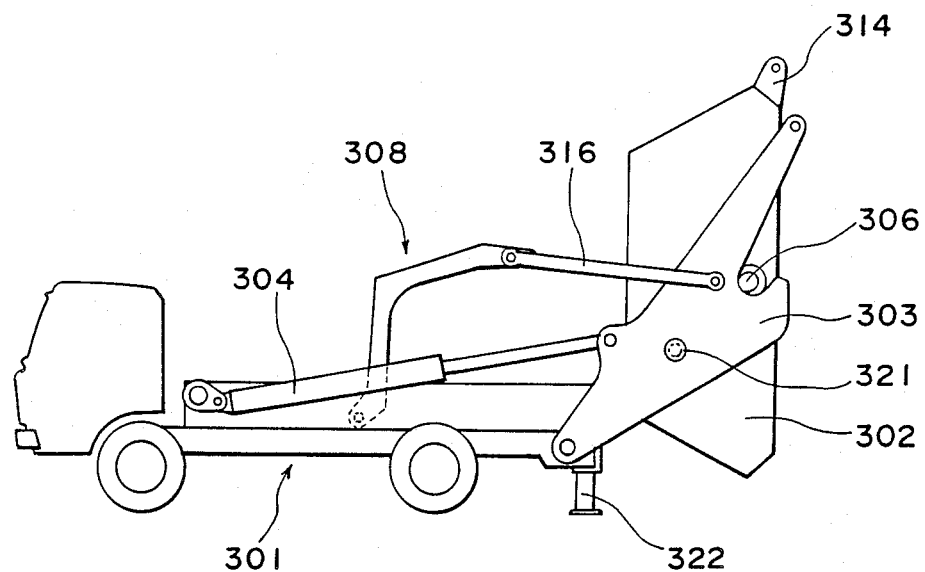

When the hydraulic cylinders 304 are fully most contracted, the container 302 is placed on the body 301 as shown in FIG. 23(d), and the running operation is performed after the out-rigger 322 has been accommodated. In this case, as the horizontal portion 309 of the auxiliary arm 308 is engaged into the indentation portion 310 of the body 301, and the vertical portion 312 is located forwardly of the container 302, the auxiliary arm 308 may not interfere with the placement of the container 302.

In order to unload the container, the container may be unloaded by the operation opposite to the above description.

In order to dump the container, a pin 315 which combines the combination portion 313 of the auxiliary arm 308 with the bracket 314 of the container 302 is pulled out from the condition of FIG. 23(d) so as to insert the pins 321 into the holes 319 of the support arms 303 and into the holes 320 of the container 302 to secure the container 302 to the support arms 303.

After the out-rigger 322 has been extended in this condition, the hydraulic cylinders 304 are extended to rearwardly pivot the support arms 303.

The container 302 integrated with the support arms 303 is dumped by the pivotal operation of the support arms 303. In this case, as the auxiliary arm 308 also pivots rearwardly by the coupling rods 316, but does not contact as it is sufficiently away from the container 302.

As is clear from the foregoing description, according to the arrangement of the present invention, the container is raised by the support arms sideways of the rear portion of the body, and the container is adapted to be retained horizontal by the auxiliary arm provided in the front portion of the body. Accordingly, the container is prevented from being oscillated or inclined during the unloading operation of the container so that the unloading operation may be safely performed.

Also, both the arms are coupled by a coupling rod. When one arm is pivoted, the other arm may be also pivoted by the pivoting operation of one arm. Accordingly, the driving means is reduced in number so that inexpensive production may be realized.

Although the present invention has been fully described by way of example with reference to the accompanying drawings, it is to be noted here that various changes and modifications will be apparent to those skilled in the art. Therefore, unless such changes and modifications depart from the scope of the present invention, they should be construed as being included therein.

What is claimed is:

1. A cargo-work vehicle for detachably supporting a container of the type having a pin-receiving hole at a front portion thereof, and a support on the container above the center of gravity thereof, said vehicle comprising:

a vehicle body having front and rear portions;

left and right lift arms for rotatably supporting the container by the support thereon, and pivotally attached at said rear portion of said vehicle body;

a single auxiliary arm having front and rear ends, said auxiliary arm being substantially L-shaped and having a front and rear leg, being pivotably attached at its rear end to said vehicle body, and being pivotably attachable at its front end to the pin-receiving hole at the front portion of the container, said rear leg of said auxiliary arm being located substantially underneath the container when the container is in a forwardmost loaded position on the vehicle body;

an insertion pin means attached to said front arm, said insertion pin means including a movable insertion pin for selectively engaging said front end of said auxiliary arm with the pin-receiving hole at the front portion of the container for selectively attaching said front end of said auxiliary arm thereto;

means for selectively engaging said insertion pin means and the front portion of the container;

a main hydraulic cylinder means pivotably attached to said vehicle body at one end thereof and to said left and right lift arms at the other end thereof for rotating said lift arms;

an auxiliary hydraulic cylinder means pivotably attached to said vehicle body and to said auxiliary arm for rotating said auxiliary arm; and control means for actuating said auxiliary and main hydraulic cylinder means, said control means actuating said auxiliary hydraulic cylinder means concurrently with or independently of said main hydraulic cylinder means, said control means actuating said main cylinder means for rotating said lift arms independently rearwardly for initially engaging said lift arms with the container for loading the container onto said vehicle body, said control means actuating said auxiliary cylinder means for rotating said auxiliary arm independently rearwardly for engaging said front end of said auxiliary arm with the front end of the container to be loaded, said control means concurrently actuating said main and auxiliary hydraulic cylinder means for rotating said lift and auxiliary arms forwardly for loading the container onto said vehicle body, said control means concurrently actuating said main and auxiliary hydraulic cylinder means for rotating said lift and auxiliary arms rearwardly for unloading the container from said vehicle body, and said auxiliary arm maintaining the attitude of the container constant during the loading and unloading thereof.

2. A cargo-work vehicle as in claim 1, further comprising, a dump pin means for selectively engaging the container for fixedly retaining the attitude of the container relative to said lift arms;

means for selectively engaging said dump pin means and the container;

said dump pin means being disengaged from the container when unloading the container for allowing rotation of the container relative to said lift arms; and said dump pin means being engaged with the container and said insertion pin means being disengaged from the container when dumping the container for fixing the container relative to said lift arms and for allowing the container to rotate relative to said auxiliary arm.

3. A cargo-work vehicle as in claim 1, further comprising:

coupling rod means having a front and rear end, extending between said front leg of said L-shaped auxiliary arm and each said left and right lift arms, and being pivotably attached at said front and rear ends to said auxiliary arm and said left and right lift arms.

4. A cargo-work vehicle as in claim 2, wherein said lift arms are hollow, and said means for selectively engaging said dump pin means and the container is located substantially within said lift arms.

* * * * *